(12) United States Patent
Kim et al.

(10) Patent No.: US 11,531,870 B2
(45) Date of Patent: Dec. 20, 2022

(54) NEURAL NETWORK APPARATUS AND METHOD OF PROCESSING VARIABLE-RESOLUTION OPERATION BY THE SAME

(71) Applicant: Samsung Electronics Co., Ltd., Suwon-si (KR)

(72) Inventors: Sungho Kim, Yongin-si (KR); Cheheung Kim, Yongin-si (KR); Jaeho Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 709 days.

(21) Appl. No.: 16/557,182

(22) Filed: Aug. 30, 2019

(65) Prior Publication Data

US 2020/0242454 A1    Jul. 30, 2020

(30) Foreign Application Priority Data

Jan. 30, 2019    (KR) ........................ 10-2019-0012135

(51) Int. Cl.
*G06N 3/063*    (2006.01)
*G06F 7/57*    (2006.01)
*G06N 3/08*    (2006.01)

(52) U.S. Cl.
CPC .............. *G06N 3/063* (2013.01); *G06F 7/57* (2013.01); *G06N 3/08* (2013.01)

(58) Field of Classification Search
CPC ........ G06N 3/063; G06N 3/08; G06N 3/0481; G06N 3/04; G06F 7/57; G06F 2207/4824
See application file for complete search history.

(56) References Cited

U.S. PATENT DOCUMENTS

| | | | |
|---|---|---|---|
| 5,444,822 A | 8/1995 | Shinohara | |
| 9,886,662 B2 | 2/2018 | Alvarez-Icaza Rivera et al. | |
| 2016/0260008 A1 | 9/2016 | Arthur et al. | |
| 2018/0181858 A1* | 6/2018 | Son | G06N 3/0445 |
| 2018/0253635 A1* | 9/2018 | Park | G06F 7/523 |
| 2020/0074286 A1 | 3/2020 | Kim et al. | |

FOREIGN PATENT DOCUMENTS

| EP | 664516 A2 * | 7/1995 | ........... G06N 3/0481 |
|---|---|---|---|
| KR | 101806833 B1 | 12/2017 | |
| KR | 10-2020-0026588 A | 3/2020 | |

\* cited by examiner

*Primary Examiner* — Farley Abad
(74) *Attorney, Agent, or Firm* — Harness, Dickey & Pierce, P.L.C.

(57) ABSTRACT

A neural network apparatus that is configured to process an operation includes neural network circuitry configured to receive a first input of an n-bit activation, store a second input of an m-bit weight, perform a determination whether to perform an operation on an $i^{th}$ bit of the first input and a $j^{th}$ bit of the second input, output an operation value of an operation performed on the $i^{th}$ bit of the first input and the $j^{th}$ bit of the second input based on the determination, and produce an operation value of the operation based on the determination.

18 Claims, 15 Drawing Sheets

$ABC_2$ —— 711
$x\ DEF_2$ —— 712
———————
GHI —— 713
JKL —— 714
MNO —— 715
———————
$PQRSTU_2$ —— 716

NEURAL NETWORK APPARATUS AND METHOD OF PROCESSING VARIABLE-RESOLUTION OPERATION BY THE SAME

CROSS-REFERENCE TO RELATED APPLICATION

This application is based on and claims priority under 35 U.S.C. § 119 to Korean Patent Application No. 10-2019-0012135, filed on Jan. 30, 2019, in the Korean Intellectual Property Office, the disclosure of which is incorporated by reference herein in its entirety.

BACKGROUND

1. Field

The present disclosure relates to a neural network apparatus and a method of processing variable-resolution operation by the neural network apparatus.

2. Description of the Related Art

There is growing interest in neuromorphic processors that perform neural network operations. Research has been conducted to realize a neuromorphic processor including neuron circuitry and synapse circuitry. Such a neuromorphic processor may be used as a neural network device to drive various neural networks such as a convolutional neural network (CNN), a recurrent neural network (RNN), and a feedforward neural network (FNN), and may be used in fields including data classification and image recognition.

SUMMARY

Some example embodiments may include neural network apparatuses and/or methods of processing operations by neural network apparatuses.

Additional aspects will be set forth in part in the description which follows and, in part, will be apparent from the description, or may be learned by practice of the presented embodiments.

According to an aspect of some example embodiments, a neural network apparatus that processes a neural network operation includes neural network circuitry configured to receive a first input corresponding to an $i^{th}$ bit of an n-bit activation, wherein n is a natural number and i is a natural number between 1 and n inclusive; store a second input corresponding to a $j^{th}$ bit of an m-bit weight, wherein m is a natural number and j is a natural number between 1 and m inclusive; perform a determination whether the operation is to be performed on the $i^{th}$ bit and the $j^{th}$ bit; and based on the determination being a positive determination, perform the operation on the $i^{th}$ bit and the $j^{th}$ bit, and produce an operation value of the operation performed on the $i^{th}$ bit and the $j^{th}$ bit.

According to some example embodiments, a method of processing a operation by a neural network apparatus includes determining a first input corresponding to an $i^{th}$ bit of an n-bit activation, and a second input corresponding to a $j^{th}$ bit of an m-bit weight; performing a determination whether an operation is to be performed on the first input and the second input, and produce a positive determination or a negative determination as a result of the determination; and performing the operation on the first input and the second input to produce an operation value based on the positive determination, wherein n and m are natural numbers, i is a natural number between 1 and n inclusive, and j is a natural number between 1 and m inclusive.

According to an aspect of some example embodiments, a non-transitory computer-readable recording medium may have recorded thereon a program that, when executed by a computer, performs the method.

BRIEF DESCRIPTION OF THE DRAWINGS

These and/or other aspects will become apparent and more readily appreciated from the following description of some example embodiments, taken in conjunction with the accompanying drawings in which.

DETAILED DESCRIPTION

In some example embodiments set forth herein, general terms that have been widely used nowadays are selected, if possible, in consideration of functions of some example embodiments, but non-general terms may be selected according to the intentions of technicians in the this art, precedents, or new technologies, etc. Furthermore, some terms may be arbitrarily chosen by the present applicant. In this case, the meanings of these terms will be explained in corresponding example embodiments in detail. Thus, the terms used herein should be defined not based on the names thereof but based on the meanings thereof and the whole context of the example embodiments.

It may be understood that, in a description of some example embodiments, when a part is referred to as being "connected to" another part, the part is directly connected to the other part or is electrically connected to the other part via an element. It will be further understood that the term "include" or "comprise," when used herein, specify the presence of stated elements or operations, but do not preclude the presence or addition of one or more other elements or operations.

While the terms "first", "second", etc., may be used to describe various elements, the elements should not be construed as being limited by these terms. These terms are used only to distinguish one element from another.

A description of some example embodiments which will be described below should not be construed as limiting the scope of the present disclosure, and matters that are obvious to those of ordinary skill in the art should be construed as being within the scope of some example embodiments. Hereinafter, some example embodiments will be described in detail with reference to the accompanying drawings.

As used herein, the term "and/or" includes any and all combinations of one or more of the associated listed items. Expressions such as "at least one of," when previous a list of elements, modify the entire list of elements and do not modify the individual elements of the list.

Figure 1:
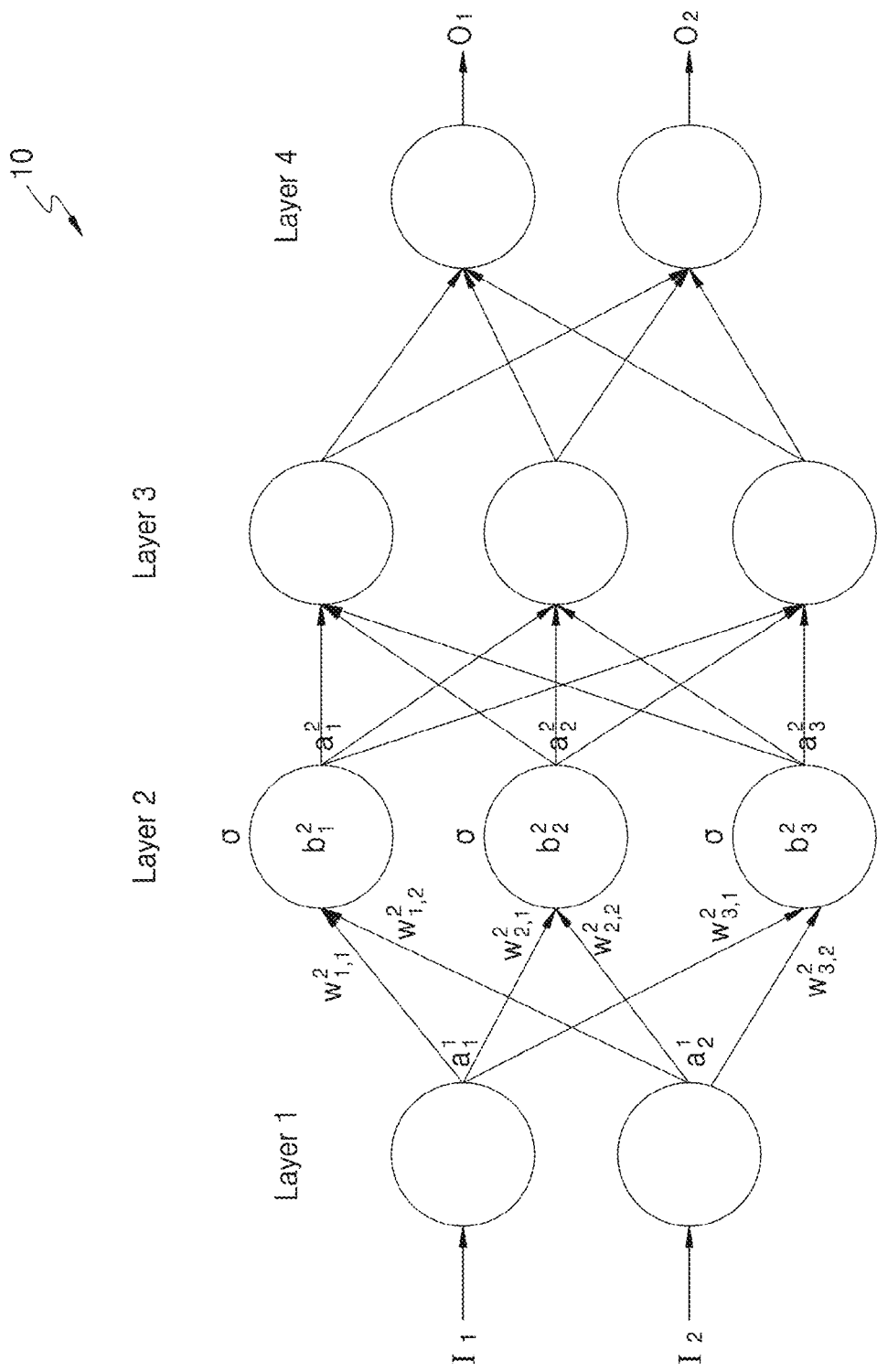
FIG. 1 is a diagram of a neural network according to some example embodiments.

FIG. 1 is a diagram of a neural network according to some example embodiments.

FIG. 1 illustrates an example of a neural network 10 that includes an input layer, hidden layers, and an output layer. The neural network 10 may be configured to perform an operation, based on received input data (e.g., $I_1$ and $I_2$), and produce output data (e.g., $O_1$ and $O_2$) of an operation value as a result of performing the operation.

In some example embodiments, the neural network 10 may be a deep neural network (DNN) or n-layer neural networks including two or more hidden layers. For example, as illustrated in FIG. 1, the neural network 10 may be a DNN that includes an input layer Layer 1, two hidden layers Layer 2 and Layer 3, and an output layer Layer 4. Examples of the DNN may include, but are not limited to, a convolutional neural network (CNN), a recurrent neural network (RNN), a feedforward neural network (FNN), deep belief networks, and restricted Boltzman machines.

Although FIG. 1 illustrates that the neural network 10 includes four layers, some example embodiments are not limited thereto and the neural network 10 may include less than or more than four layers. Alternatively, the neural network 10 may include various types of layers different from those of FIG. 1.

Each of the layers illustrated in the neural network 10 may include a plurality of artificial neurons known as "neurons", "processing elements (PEs)", "units", "nodes", or terms similar thereto. For example, as illustrated in FIG. 1, the input layer Layer 1 may include two neurons, and the hidden layer Layer 2 may include three neurons. The number of neurons of each of the layers Layer 1 and Layer 2 are merely an example, and the layers of the neural network 10 may include various numbers of neurons.

The neurons included in each of the layers of the neural network 10 may be connected to each other to exchange data. For example, one neuron may be configured to perform an operation by receiving data from neurons of a previous layer and to produce an operation value by performing the operation to neurons of a subsequent layer.

An output of each neuron may be referred to as an activation. The activation may be an operation value of one neuron and may be also an input value of neurons included in a subsequent layer. Each neuron may identify an activation thereof, based on activations received from neurons included in a previous layer and weights. A weight is a parameter used to calculate an activation of each neuron and may be a value allocated to a correlation between neurons. The weight may be stored at a synapse connecting neurons.

Each neuron may be a computational unit that is configured to receive an input and produce an operation value, such as an activation, and to map an input and an operation value or output to each other. For example, when $\sigma$ is an activation function, $w_{jk}^i$ is a weight assigned from a $k^{th}$ neuron included in an $(i-1)^{th}$ layer to a $j^{th}$ neuron included in an $i^{th}$ layer, $b_j^i$ is a bias of the $j^{th}$ neuron included in the $i^{th}$ layer, and $a_j^i$ is an activation of the $j^{th}$ neuron included in the $i^{th}$ layer, an activation $a_j^i$ may be calculated by Equation 1 below.

$$a_j^i = \sigma\left(\sum_k (w_{jk}^i \times a_k^{i-1}) + b_j^i\right) \quad \text{[Equation 1]}$$

As described above, an example neural network operation may include a multiplication operation of multiplying an output value of a neuron of a previous layer and a weight of a synapse, and an addition operation of adding results of multiplications at a receiving neuron.

Figure 2:
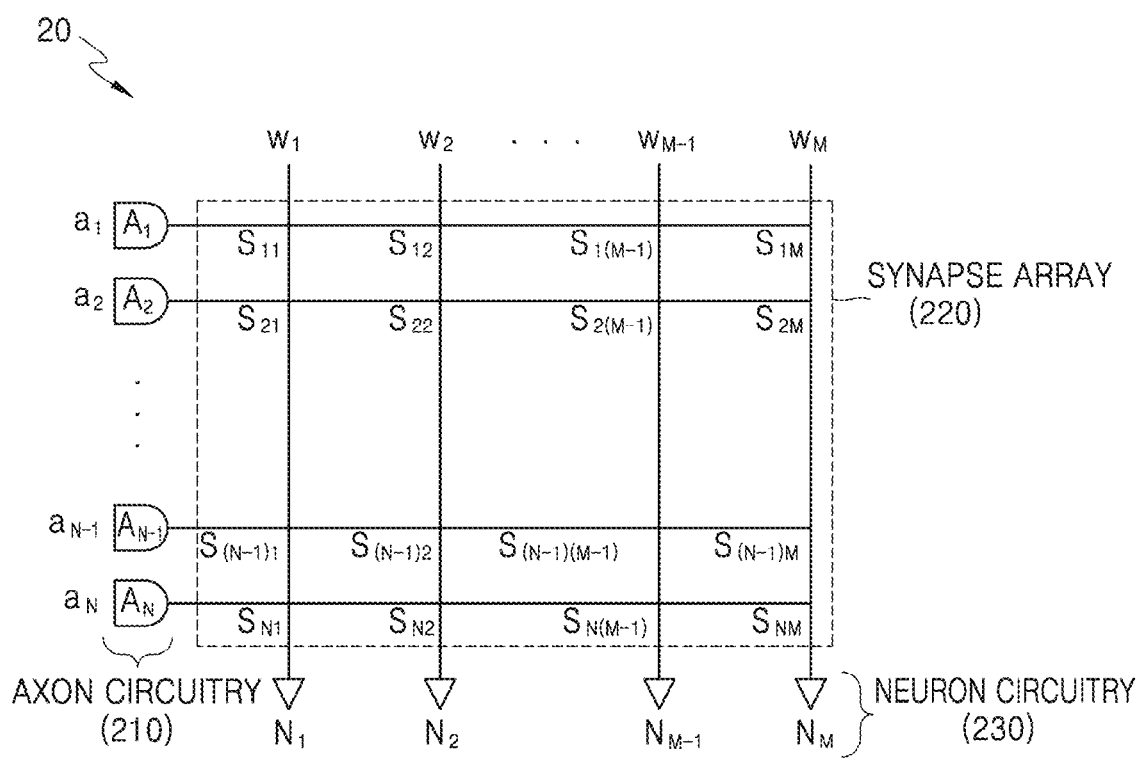
FIG. 2 is a diagram for describing a configuration of a two-dimensional (2D) array circuitry for performing a neural network operation.

FIG. 2 is a diagram for describing a configuration of two-dimensional (2D) array circuitry for performing a neural network operation.

FIG. 2 illustrates a configuration of 2D array circuitry 20 for performing the neural network operation described above with reference to FIG. 1. The configuration of the 2D array circuitry 20 includes N axon circuits $A_1$ to $A_N$ 210, M neuron circuits $N_1$ to $N_M$ 230, and an N×M synapse array $S_{11}$ to $S_{NM}$ 220, wherein N and M are each natural numbers.

Synapses of the respective synapse array $S_{11}$ to $S_{NM}$ 220 may be arranged at intersections of first-direction lines extending in a first direction from the axon circuits $A_1$ to $A_N$ 210 and second-direction lines extending in a second direction from the neuron circuits $N_1$ to $N_M$ 230. Here, it is illustrated that the first direction is a row direction and the second direction is a column direction for convenience of explanation, but the first and second directions are not limited thereto, and the first direction may be a column direction and the second direction may be a row direction.

The axon circuits $A_1$ to $A_N$ 210 may receive activations (e.g., activations $a_1, a_2, \ldots, a_N$) and transmit the activations to the first-direction lines. The activations correspond to neurotransmitters transmitted via neurons, and may be electric signals input to the axon circuits $A_1$ to $A_N$ 210. Each of the axon circuits $A_1$ to $A_N$ 210 may include a memory, register, or buffer storing input information. The activations may be binary activations each having a binary value. For example, a binary activation may include 1-bit information corresponding to a logic value 0 or 1. However, the activations are not limited thereto, and may each be a multi-bit value.

Each of the synapses of the synapse array $S_{11}$ to $S_{NM}$ 220 may store a weight corresponding to strength of a connection between neurons. In FIG. 2, for convenience of explanation, $w_1, w_2, \ldots, w_m$ are illustrated as examples of weights to be stored at synapses, but other weights may further be stored at the synapses. Each of the synapses of the synapse array $S_{11}$ to $S_{NM}$ 220 may include a memory device to store a weight or may be connected to another memory device storing a weight. Here, such a memory device may be, for example, a memristor. The weight may be a binary weight that is a binary value. For example, a binary weight may include 1-bit information corresponding to a logic value 0 or 1. However, the weight is not limited thereto, and may be a multi-bit value.

Each of the synapses of the synapse array $S_{11}$ to $S_{NM}$ 220 may receive an activation transmitted from one of the axon circuits $A_1$ to $A_N$ 210 via a corresponding first-direction line and produce an operation value of a neural network operation performed between the stored weight and the activation. For example, the neural network operation performed between the weight and the activation may be a multiplication operation (e.g., an AND operation), but is not limited thereto. The operation value of the neural network operation performed between the weight and the activation may be a value produced through another appropriate operation for simulating a strength or size of the activation adjusted according to strength of a connection between neurons. A magnitude or intensity of a signal transmitted from the axon circuits $A_1$ to $A_N$ 210 to the neuron circuits $N_1$ to $N_M$ 230 may be adjusted, based on the neural network operation performed between the weight and the activation.

Each of the neuron circuits $N_1$ to $N_M$ 230 may receive the operation value of the neural network operation performed between the weight and the activation via a corresponding second-direction line. Each of the neuron circuits $N_1$ to $N_M$ 230 may determine whether to output a spike, based on the operation value of the neural network operation. For example, each of the neuron circuits $N_1$ to $N_M$ 230 may output a spike when a value of accumulated results of the neural network operation is equal to or greater than a predetermined threshold. The spikes output from the neuron circuits $N_1$ to $N_M$ 230 may correspond to an activation to axon circuits of a next stage.

Figure 3A:
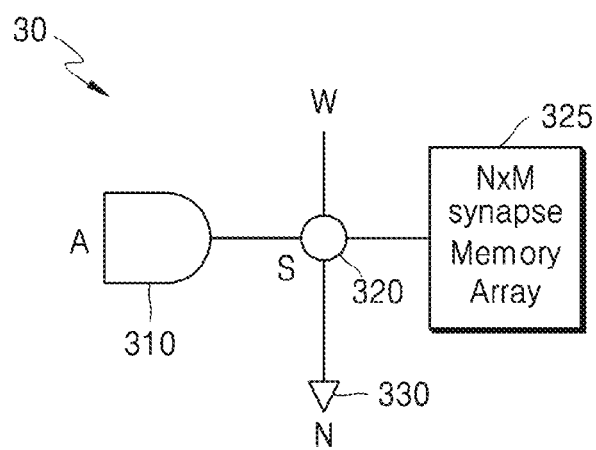
FIG. 3A is a diagram of symbols for describing components of a neural network processor included in a neural network apparatus according to some example embodiments.

FIG. 3A is a diagram of symbols for describing components of neural network processing circuitry 30 that may be included in a neural network apparatus according to some example embodiments. FIG. 3A, as well as other Figures included herein (such as FIG. 3B, FIG. 4A, FIG. 4B, FIG. 5, etc.), is presented as an illustration of an example embodiment. It is to be appreciated that the example embodiment depicted in each figure includes an example organization of the neural network apparatus, and that other example embodiments may feature a different organization, such as more or fewer components (including neuron circuitry configured to perform some or all of the operations), or a different arrangement of components to carry out the operations of the neural network apparatus. A variety of example embodiments organized in a same, similar, or different manner as the example embodiment of FIG. 3 may be devised, and all such example embodiments and variations thereof may be consistent with the present disclosure. The scope of the present disclosure is to be determined only by the claims appended hereto.

Some example embodiments, including example embodiments shown in the figures, may include various forms of circuitry, including (for example) neural network processing circuitry; neuron circuitry; axon circuitry; synapse circuitry; neuron circuitry; adder circuitry; control circuitry; and controller circuitry. It is to be appreciated that these and other forms of circuitry may include hardware such as logic circuits; a hardware/software combination, such as a processor executing software; or a combination thereof. For example, a processor may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Referring to FIG. 3A, an example embodiment of the neural network processing circuitry 30 may include axon circuitry 310, synapse circuitry 320, and neural network circuitry 330. In this example embodiment, the synapse circuitry 320 may be configured to receive weights from an N×M synapse memory array 325 included in an external memory device. The configuration of the 2D (N×M) array circuitry 20 described above with reference to FIG. 2 may be embodied using the axon circuitry 310, the synapse circuitry 320, and the neural network circuitry 330 of FIG. 3A. The axon circuits $A_1$ to $A_N$ 210 of FIG. 2 may correspond to the axon circuitry 310, the synapse array $S_{11}$ to $S_{NM}$ 220 may correspond to the synapse circuitry 320, and the neuron circuits $N_1$ to $N_M$ 230 may correspond to the neural network circuitry 330.

The axon circuitry 310 of the neural network processing circuitry 30 may be configured to process activations in a time-division manner so that the axon circuitry 310 may operate similar to the axon circuits $A_1$ to $A_N$ 210 of FIG. 2. Similarly, in order to operate like the synapse array $S_{11}$ through $S_{NM}$ 220 of FIG. 2, the synapse circuitry 320 of the neural network processing circuitry 30 may be configured to store weights in the time-division manner so that the synapse circuitry 320 may be configured to operate similar to the synapse array $S_{11}$ to $S_{NM}$ 220 of FIG. 2.

In some example embodiments, the axon circuitry 310 may be configured to operate as the axon circuitry $A_1$ of FIG. 2 at a point in time $t_1$, operate as the axon circuitry $A_2$ of FIG. 2 at a point of time $t_2$, and operate as the axon circuitry $A_N$ of FIG. 2 at a point of time $t_N$. The synapse circuitry 320 may be configured to operate as the synapse $S_{11}$ of FIG. 2 at a point of time $t_{1-1}$, operate as the synapse $S_{12}$ of FIG. 2 at a point of time $t_{1-2}$, and operate as the synapse $S_{NM}$ of FIG. 2 at a time of time=$t_{N-M}$. The neural network circuitry 330 may also be configured to operate as the neuron circuits $N_1$ to $N_M$ 230 of FIG. 2 in the same manner. Here, the points of time are all points of time and are denoted by different reference numerals to be distinguishable. As such, when each of the axon circuitry 310, the synapse circuitry 320, and the neural network circuitry 330 operates at one of certain points in time in the time-division manner, (1×1) circuitry may be embodied as operating as if a plurality of (N×M) circuits operate. For example, the 2D (N×M) array circuitry 20 of FIG. 2 may be embodied as the neural network processing circuitry 30 of (1×1) circuits by operating each circuitry of the 2D (N×M) array circuitry 20 in the time-division manner.

In some example embodiments, the neural network processing circuitry 30 may be capable of processing not only a 1-bit operation but also a variable-resolution operation, which may permit a selection of a number of bits between 1 and a larger integer, by appropriately controlling a point of time at which each of the (1×1) circuits will operate in a time-division manner. For example, the neural network processing circuitry 30 may be configured to perform an operation between an n-bit activation (here, n is a natural number) and an m-bit weight (here, m is a natural number). In this case, the axon circuitry 310 of the neural network processing circuitry 30 may receive a first input corresponding to an $i^{th}$ bit of the n-bit activation at a certain point of time (here, i is a natural number greater than or equal to 1 and equal to or less than n), and the synapse circuitry 320 of the neural network processing circuitry 30 may be configured to store a second input corresponding to a $j^{th}$ bit of the m-bit weight (here, j is a natural number greater than or equal to 1 and equal to or less than m) and produce an operation value of an operation performed between the first and second inputs at a certain point of time. For example, the value of the operation performed between the first and second inputs may be a value obtained by multiplying the first and second bits but is not limited thereto.

In some example embodiments, the neural network circuitry 330 of the neural network processing circuitry 30 may be configured to obtain values of the operation performed between the n-bit activation and the m-bit weight by performing the addition operation on, as inputs, the operation value from the synapse circuitry 320. The neural network circuitry 330 will be described in more detail below with reference to FIG. 3B. However, it is to be appreciated that some example embodiments may include other forms of processing, including other basic arithmetic operations including subtraction, multiplication, and/or division; advanced arithmetic operations such as linear algebra and/or vector operations; and/or logical but not necessarily arithmetic operations, such as a pooling operation (e.g., avgpool or maxpool) of a convolutional neural network layer.

Figure 3B:
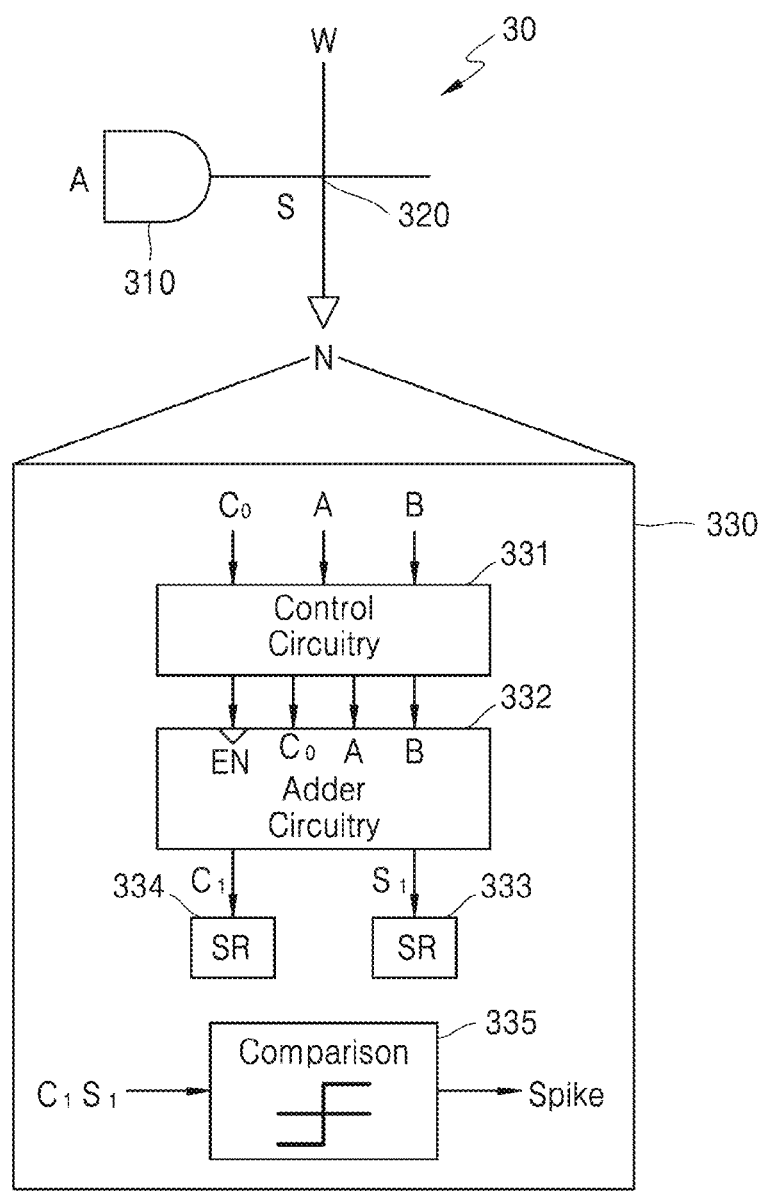
FIG. 3B is a diagram of symbols for describing components of neuron circuitry of neural network processing circuitry according to some example embodiments.

FIG. 3B is a diagram of symbols for describing components of neural network circuitry 330 of a neural network processing circuitry 30, according to some example embodiments.

Referring to FIG. 3B, some example embodiments of the neural network circuitry 330 of the neural network processing circuitry 30 may include control circuitry 331, adder circuitry 332, shift registers 333 and 334, and a comparator 335. However, some example embodiments may include a different set of components than the components illustrated in FIG. 3B of the neural network circuitry 330. For example, in some example embodiments, the neural network circuitry 330 may further include components other than the components of FIG. 3B or may include only some of the components of FIG. 3B.

In some example embodiments, The control circuitry 331 may be circuitry configured to determine whether the operation is to be performed on, as an input, at least one of values of an operation output from the synapse circuitry 320 to produce an operation value of an operation between an n-bit activation and an m-bit weight, and to output the operation value, wherein the producing the operation value and the outputting the operation value are based on the determination.

For example, the control circuitry 331 may perform the determination based on whether the value of the operation is influenced by an operation value of the operation (e.g., a preceding instance of the operation) performed on, as an input, at least one of the values of the operation output from the synapse circuitry 320, and the determination may be a negative determination when the operation value of the operation is not influenced by the operation value of a preceding instance of the operation.

In some example embodiments, the neural apparatus may include an adder circuitry 332 as combination circuitry having three inputs (e.g., an augend A, an addend B, and/or a previous carry digit $C_0$) and/or two outputs (e.g., non-carry sum $S_1$ and/or a carry digit $C_1$). In some example embodiments, the adder circuitry 332 may correspond to a full adder. When receiving a positive determination (such as an enable signal) from the control circuitry 331, the adder circuitry 332 may be configured to perform the addition operation and obtain one of bits representing values of the operation. Some example embodiments in which a value of the addition operation performed by the adder circuitry 332 may correspond to one of the bits representing the operation value of the operation will be described in more detail below with reference to FIGS. 6 to 8C.

When the determination by the control circuitry 331 is a negative determination, the adder circuitry 332 may be configured to skip the addition operation. The negative determination from the control circuitry 331 may be determined when the operation value of the addition operation may not be influenced by an operation value of a preceding instance of the addition operation, and thus the adder circuitry 332 may be configured to refrain from performing an unnecessary addition operation that may not have an influence on another instance of the addition operation. Accordingly, in some example embodiments, power consumption for the adder circuitry 332 to perform the addition operation may be reduced, and total efficiency of the neural network operation may be increased due to skipping of unnecessary operations. Alternatively or additionally, in some example embodiments, the operation of the neural network circuitry may complete faster, such as by reducing memory access and/or expediting the completion of logical and/or arithmetic processing. Faster processing may enable, for example, more rapid completion of a neural network training or retraining process; an undertaking a more complex or comprehensive neural network training or retraining process, which may involve more logical operations within a time frame; and/or more rapid inference of a trained neural network, which may be advantageous, for example, in realtime or otherwise time-sensitive machine learning scenarios, such as robotics, industrial processing systems, and/or autonomous vehicles.

Example embodiments of the neural network circuitry 330 that include the control circuitry 331 will be described below with reference to FIGS. 4A and 4B.

Figure 4A:
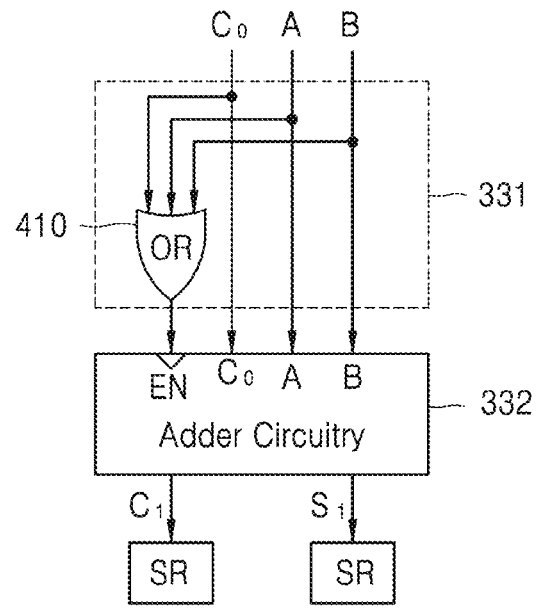
FIG. 4A is a diagram of an example of neuron circuitry according to some example embodiments.

FIG. 4A is a diagram of an example of neuron circuitry according to some example embodiments. FIG. 4A illustrates an example embodiment in which the control circuitry 331 of the neural network circuitry 330 includes gate circuitry 410. The gate circuitry 410 may be configured to receive at least some of a predetermined initial value, a value of an operation output from preceding instance of the operation, for example, produced by the synapse circuitry 320 at a previous point of time, a value of the operation output from the synapse circuitry 320 at a current point of time, a value of addition processed by the adder circuitry 332 from a preceding instance of the operation, for example, at the previous point of time, and a carry digit determined by the adder circuitry 332 from a preceding instance of the operation, for example, at the previous point of time. The predetermined initial value or the carry digit determined by the adder circuitry 332 at the previous point of time may correspond to $C_0$ of FIG. 4A. A value among the value of the operation output from the synapse circuitry 320 at the previous point of time, the value of the operation output from the synapse circuitry 320 at the current point of time, and the value of addition processed by the adder circuitry 332 at the previous point of time may correspond to A or B of FIG. 4A.

The gate circuitry 410 may be configured to output a negative determination (such as a disable signal) when all the received values of a set of received values (e.g., the values $C_0$, A and B) are equal to a first value and to output a positive determination (such as an enable signal) when any one of the received values of the set of received values is equal to a second value. For example, the first value may be "0" and the second value may be "1". The gate circuitry 410 may be an OR gate that outputs "0" as the negative determination (such as the disable signal) when all the received values are "0" and outputs "1" as the positive determination (such as the enable signal) when any one of the received values is "1". In some example embodiments, the adder circuitry 332 may include an enable terminal, and a determination (such as a signal) produced by the gate circuitry 410 may be input to the enable terminal of the adder circuitry 332. Further, some example embodiments may be configured to produce an enable or disable signal to connote the positive determination and the negative determination, while other example embodiments may be configured to utilize the determination to affect the processing of one or more bits of the operands directly and without producing an enable signal or a disable signal.

The adder circuitry 332 may be configured to perform the addition operation when the positive determination (such as the enable signal, or the value "1") is received by the enable terminal of the adder circuitry 332 and to skip the addition operation when the negative determination (such as the disable signal, or the value "0") is received by the enable terminal of the adder circuitry 332. The skipping of the addition operation performed by the adder circuitry 332 may be understood to mean that the adder circuitry 332 is not operated and power consumption for driving the adder circuitry 332 is reduced.

Figure 4B:
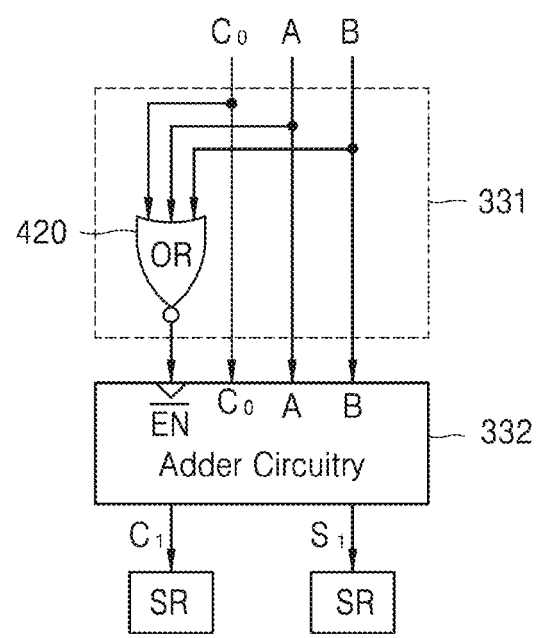
FIG. 4B is a diagram of another example of neuron circuitry according to some example embodiments.

FIG. 4B is a diagram of another example of neuron circuitry according to some example embodiments.

FIG. 4B illustrates an example embodiment in which control circuitry 331 includes gate circuitry 420 that may be configured differently than that of FIG. 4A. For example, the gate circuitry 420 may be a NOR gate that outputs "1" when all received values of a set of received values (e.g., values $C_0$, A and B) are equal to a first value (e.g., "0"), and outputs "0" when any one of the received values is equal to a second value (e.g., "1"). In this case, the adder circuitry 332 may include a disable terminal or a 'NOT' enable terminal other than the enable terminal, so that "1" output from the gate circuitry 420 may be used as a negative determination (such as a disable signal) and "0" output from the gate circuitry 420 may be used as a positive determination (such as an enable signal).

The adder circuitry 332 may be configured to perform the addition operation when the positive determination (such as the enable signal or value "0") is received by the disable terminal or the 'NOT' enable terminal of the adder circuitry 332 and to skip the addition operation when the negative determination (such as the disable signal or value "1") is received by the disable terminal or the 'NOT' enable terminal of the adder circuitry 332. FIGS. 4A and 4B illustrate cases in which the control circuitry 331 includes the gate circuitry 410 or 420 but the cases are merely example. Alternatively, the control circuitry 331 may include circuitry configured to determine an operation to be performed by the adder circuitry 332 is not necessary and output the positive determination (such as the enable signal) or the negative determination (such as the disable signal) as a result of the determination.

Referring back to FIG. 3B, the shift registers 333 and 334 may respectively store a value of addition and a carry bit output from the adder circuitry 332. Furthermore, the shift registers 333 and 334 may shift the value of addition and the carry bit stored therein by a specified number of bits to adjust the number of bits in calculation of bits representing an operation value of the operation. Each of the shift registers 333 and 334 may have a double latch structure to transmit a predetermined initial value (e.g., the first value or "0") as an input again to the adder circuitry 332, so that the addition operation may be smoothly performed at a subsequent point of time when the addition operation to be performed by the adder circuitry 332 at a current point of time is skipped.

The comparator 335 compares a result $C_1S_1$ of addition performed by the adder circuitry 332 with a predetermined threshold. Here, the predetermined threshold is a criterion for determining whether a spike is to be output to a subsequent neuron. When the comparison of the comparator 335 reveals that the result $C_1S_1$ of addition is greater than or equal to the predetermined threshold, the neural network circuitry 330 may output a spike. In some example embodiments, the comparator 335 may be configured to compare only the result $C_1S_1$ of addition performed by the adder circuitry 332 with the predetermined threshold at a certain point of time corresponds to some example embodiments in which a 1-bit operation is performed. When the comparator 335 performs the operation, a result of addition to be compared with the threshold may be accumulated results of the addition operation performed by the adder circuitry 332.

When the addition operation to be performed by the adder circuitry 332 may be skipped by the control circuitry 331, the neural network circuitry 330 may be configured to determine a result of addition and a carry digit, which would be obtained from the adder circuitry 332 unless the addition operation were skipped, to the first value (e.g., "0"). For example, the neural network circuitry 330 may be configured to store "0" in the shift registers 333 and 334 when the addition operation to be performed by the adder circuitry 332 is skipped. "0" stored in the shift registers 333 and 334 may be used in the addition operation of the adder circuitry 332 at a subsequent point of time, or may be determined to be one of bits representing an operation value of the operation. Hereinafter, a hardware configuration of a neural network apparatus with neural network processing circuitry 30 will be described with reference to FIG. 5, and a method of processing the operation by the neural network apparatus will be described in more detail with reference to FIGS. 6 to 8C.

Figure 5:
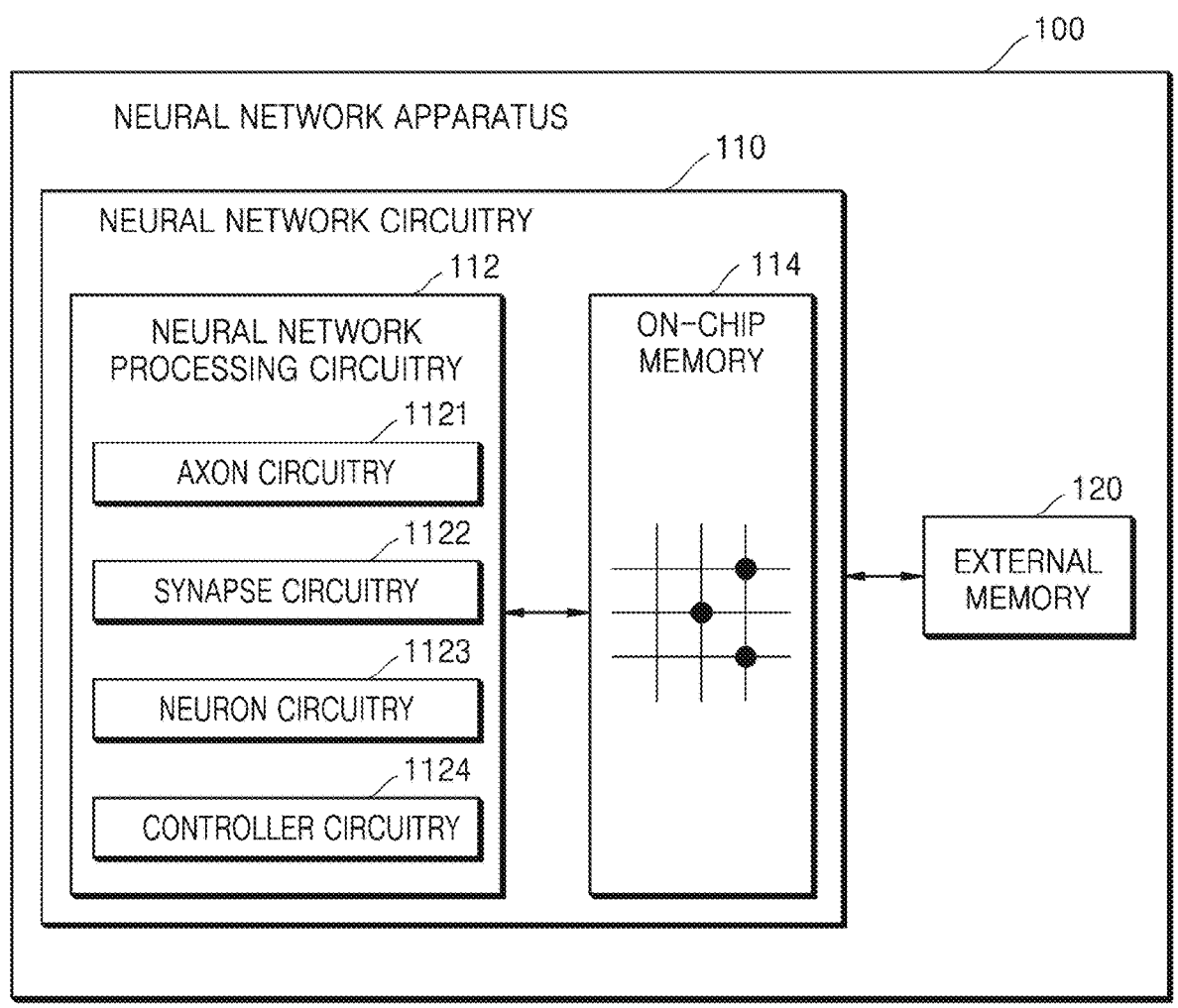
FIG. 5 is a block diagram of a hardware configuration of a neural network apparatus according to some example embodiments.

FIG. 5 is a block diagram of a hardware configuration of a neural network apparatus 100 according to some example embodiments.

Referring to FIG. 5, the neural network apparatus 100 includes neural network circuitry 110 on which neural network processing circuitry 112 and an on-chip memory 114 are mounted, and an external memory 120. The neural network processing circuitry 112 includes axon circuitry 1121, synapse circuitry 1122, neuron circuitry 1123, and controller circuitry 1124. However, FIG. 5 only illustrates components of the neural network apparatus 100 related to an example embodiment. Thus, it would be obvious to one of ordinary skill in the art that the neural network apparatus 100 may further include other general-purpose components, such as a central processing unit (CPU), a graphics processing unit (GPU), an application processor (AP), a sensor module, and a communication module, in addition to the components shown in FIG. 5.

In some example embodiments, the neural network processing circuitry 112 may correspond to the neural network processing circuitry 30 of FIG. 3A, the axon circuitry 1121 corresponds to the axon circuitry 310 of FIG. 3A, the synapse circuitry 1122 corresponds to the synapse circuitry 320 of FIG. 3A, and the neuron circuitry 1123 corresponds to the neural network circuitry 330 of FIG. 3A.

The neural network processing circuitry 112 may include a processing unit (or processor core) embodied similar to the neural network processing circuitry 30 of FIG. 3A, but is not limited thereto and the neural network processing circuitry 112 may include a plurality of processing units (or processor cores) each embodied as the neural network processing circuitry 30 of FIG. 3A.

The neural network apparatus 100 may be an apparatus included in various types of electronic devices, such as a personal computer (PC), a server device, a mobile device, and an embedded device. The neural network apparatus 100 may correspond to a hardware component included in a smart phone, a tablet device, an augmented reality (AR) device, an Internet-of-Things (IoT) device, an autonomous vehicle, a robotics, or a medical device that performs voice recognition, image recognition, image classification, etc. using a neural network. That is, the neural network apparatus 100 may correspond to an exclusive hardware (HW) accelerator mounted in such an electronic device and may be, but is not limited to, an HW accelerator operating like a neural processing unit (NPU), a tensor processing unit (TPU), a neural engine, TrueNorth, or Loihi, which may be an exclusive module for neural network driving.

The neural network circuitry 110 may be configured to control overall functions for driving a neural network in the neural network apparatus 100. For example, the neural network processing circuitry 112 of the neural network circuitry 110 performs overall control of the neural network apparatus 100 by accessing neural network data (for example, activations, weights, etc.) stored in the external memory 120 of the neural network apparatus 100 to execute neural network-related programs. The neural network circuitry 110 may drive the neural network under control of a CPU, a GPU, an AP, or the like provided inside or outside the neural network apparatus 100.

The external memory 120 is hardware storing various types of neural network data processed in the neural network circuitry 110, and may store data processed or to be processed by the neural network circuitry 110. Furthermore, the external memory 120 may store applications, drivers, etc. to be driven by the neural network circuitry 110. The external memory 120 may include random access memory (RAM), such as dynamic random access memory (DRAM) or static random access memory (SRAM), read-only memory (ROM), electrically erasable programmable read-only memory (EEPROM), a CD-ROM, Blue-ray or another optical disk storage, a hard disk drive (HDD), a solid-state drive (SSD), or a flash memory.

The on-chip memory 114 of the neural network circuitry 110 may read neural network data (activations, weights, etc.), for pre-synaptic neuron circuits, from the external memory 120, store (or buffer) the neural network data, and execute the neural network by using the stored neural network data. For example, the N×M synapse memory array 325 of FIG. 3A may correspond to the on-chip memory 114. The on-chip memory 114 may store data for post-synaptic neuron circuits, such as operation values of neural network operations produced as results of execution of the neural network, spike values, etc.

Operations and functions of the axon circuitry 1121, the synapse circuitry 1122, the neuron circuitry 1123, and the controller circuitry 1124 of the neural network processing circuitry 112 will be described below with reference to other drawings.

Figure 6:
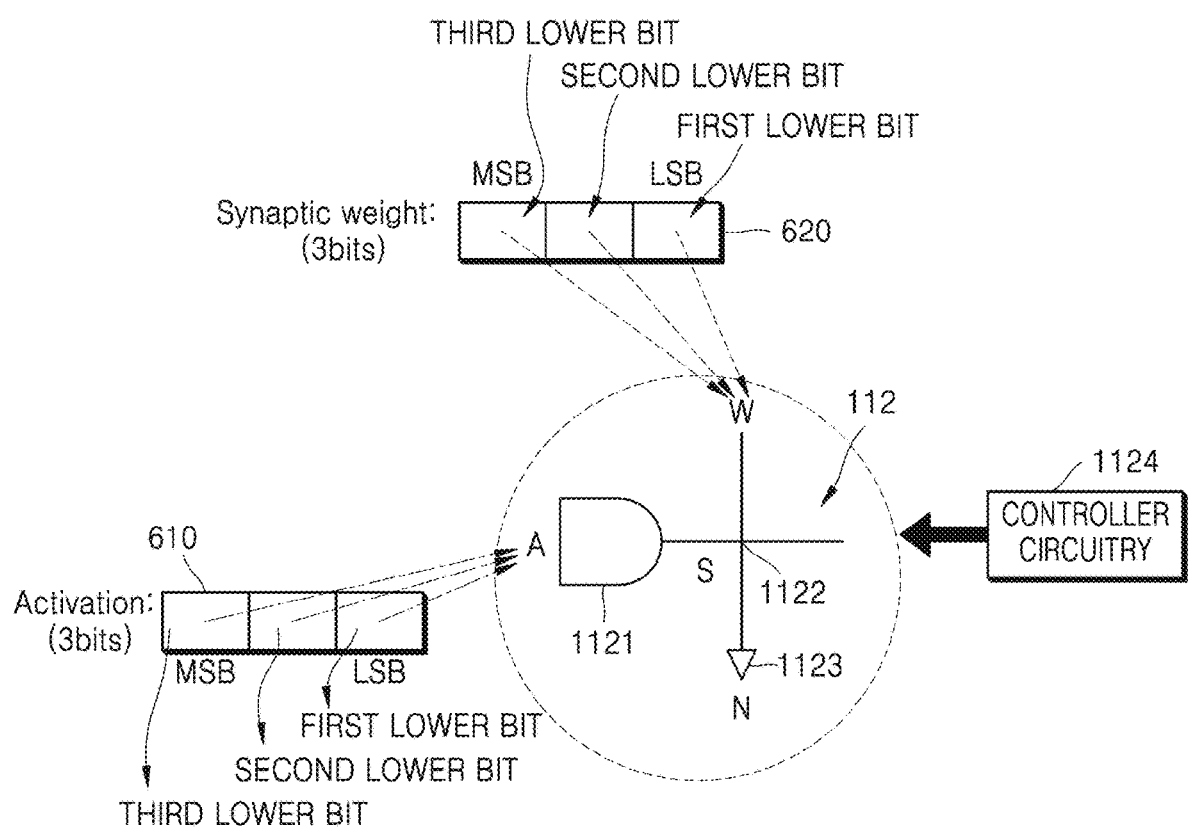
FIG. 6 is a diagram for describing inputs of neural network processing circuitry, according to some example embodiments.

FIG. 6 is a diagram for describing inputs of each circuitry of neural network processing circuitry 112, according to some example embodiments.

Referring to FIG. 6, the controller circuitry 1124 of the neural network processing circuitry 112 determines a first input corresponding to an $i^{th}$ bit of an n-bit activation 610 to be assigned to the axon circuitry 1121 at each point of time, and a second input of a $j^{th}$ bit of an m-bit weight 620 to be assigned to the synapse circuitry 1122 at each point of time. Here, n and m are each a natural number, i is a natural number between 1 and n inclusive, and j is a natural number between 1 and m inclusive.

In FIG. 6, it is assumed that for convenience of expression, the n-bit activation 610 and the m-bit weight 620 are each a 3-bit value (n=3 and m=3). However, the n-bit activation 610 and the m-bit weight 620 according to some example embodiments may not be limited thereto and may be various-bit values.

The controller circuitry 1124 may be configured to determine a bit value of which a bit position (e.g., the $i^{th}$ bit) on the n-bit activation 610 (n=3) is to be assigned as the first input to the axon circuitry 1121 at a certain point of time (e.g., a point of time $t_x$). That is, the controller circuitry 1124 determines i to determine the first input to be assigned at the point of time $t_x$. For example, i may be a value ranging from 1 to 3. When i is 1, the first input of a first bit corresponds to a least significant bit (LSB) of the n-bit activation 610, and when i is 3, the first input of a third bit corresponds to a most significant bit (MSB) of the n-bit activation 610.

Furthermore, the controller circuitry 1124 may be configured to determine a bit value of which a bit position (e.g., the $j^{th}$ bit) on the m-bit weight 620 (m=3) is to be assigned as the second input to the synapse circuitry 1122 at a certain point of time (for example, a time $t_y$). That is, the controller circuitry 1124 determines j to determine the second input to be assigned at the point of time $t_y$. For example, j may be a value ranging from 1 to 3. When j is 1, the second input of a first bit corresponds to an LSB of the m-bit weight 620, and when j is 3, the second input of a third bit corresponds to an MSB of the m-bit weight 620. It is to be appreciated that some example embodiments may utilize other forms of processing; for example, the inputs may be formatted in MSB order, or may be formatted in LSB order, wherein counters i, j may be decremented from n, m down to 1.

As such, the controller circuitry 1124 repeatedly determines the first input and the second input to be assigned respectively to the axon circuitry 1121 and the synapse circuitry 1122 by choosing the values i and j at each point of time until a lower bit value to an upper bit value of an operation value of an operation finally output from the neural network processing circuitry 112 are produced. Here, the lower bit value may be an LSB of the operation value of the operation and the upper bit value may be an MSB of the operation value of the operation. The terms "first input" and "second input" should be understood to mean values of bit positions determined by the controller circuitry 1124, and refer to values newly updated by the controller circuitry 1124 at each point of time.

The controller circuitry 1124 may map i and j such that the $i^{th}$ bit and the $j^{th}$ bit are differently combined at each point of time. For example, the controller circuitry 1124 may choose and map the values i and j, such that combinations from a combination of the $i^{th}$ bit (e.g., an LSB) and the $j^{th}$ bit (e.g., an LSB) mapped such that the sum of i and j is smallest to a combination of the $i^{th}$ bit (e.g., an MSB) and the $j^{th}$ bit (e.g., an MSB) mapped such that the sum of i and j is largest are sequentially assigned to each of the axon circuitry 1121 and the synapse circuitry 1122. Here, the total number of combinations of the $i^{th}$ bit and the $j^{th}$ bit corresponds to a product of n and m, e.g., a total of 9(=3×3) combinations in the example of FIG. 6. For example, the controller circuitry 1124 may initially map a bit value (first input) of an LSB (i=1) of the n-bit activation 610 and a bit value (second input) of an LSB (j=1) of the m-bit weight 620 at an initial time, and lastly map a bit value (first input) of an MSB (i=3) of the n-bit activation 610 and a bit value (second input) of an MSB (j=3) of the m-bit weight 620 at a last time.

The axon circuitry 1121 of the neural network processing circuitry 112 receives the first input of the $i^{th}$ bit of the n-bit activation 610 determined by the controller circuitry 1124. The synapse circuitry 1122 of the neural network processing circuitry 112 stores the second input of the $j^{th}$ bit of the m-bit weight 620 determined by the controller circuitry 1124.

The axon circuitry 1121 and the synapse circuitry 1122 are circuits capable of processing a bit value (e.g., a 1-bit value). Accordingly, the axon circuitry 1121 and the synapse circuitry 1122 are capable of respectively processing only a bit value (first input) of a certain position on the n-bit activation 610 and a bit value (second input) of a certain position on the m-bit weight 620.

When the second input of the $j^{th}$ bit is stored in the synapse circuitry 1122, the synapse circuitry 1122 outputs a value of an operation performed between the first input received from the axon circuitry 1121 and the second input stored in the synapse circuitry 1122. The operation performed by the synapse circuitry 1122 may be a multiplication operation (e.g., an AND operation) performed on the first and second inputs but is not limited thereto.

The neuron circuitry 1123 of the neural network processing circuitry 112 obtains each bit value of the operation value of the operation performed between the n-bit activation 610 and the m-bit weight 620, based on the operation value of the operation produced by the synapse circuitry 1122, as will be described in detail below with reference to a corresponding drawing.

Figures 7A, 7B:
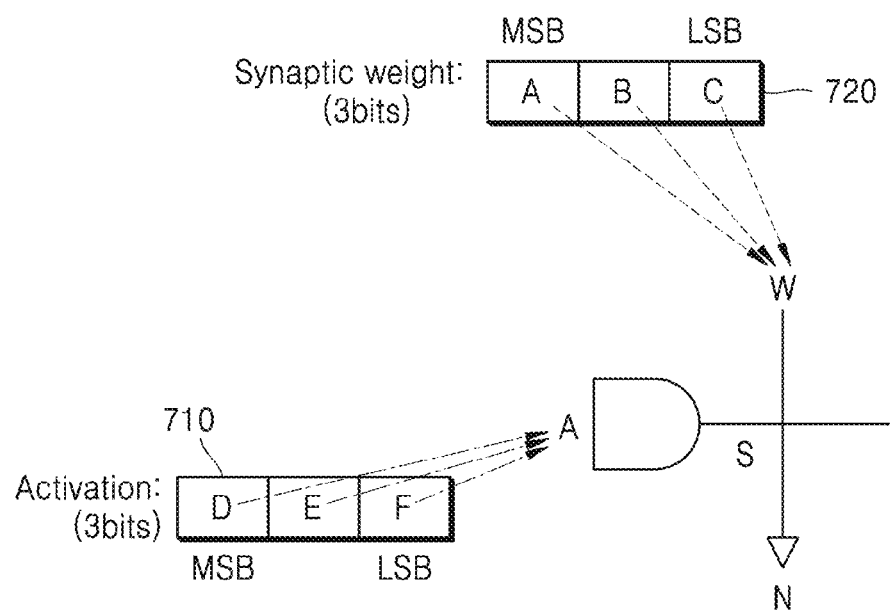
FIG. 7A is a diagram for describing an operation performable by a neural network apparatus, according to some example embodiments.
FIG. 7B is a diagram for describing mapping of operands to an activation and a weight to perform an operation (e.g., a variable-resolution multiplication operation), according to some example embodiments.

FIG. 7A is a diagram for describing a operation performable by a neural network apparatus, according to some example embodiments.

Referring to FIG. 7A, a multiplication operation between 3-bit binary values is illustrated as an example of the variable-resolution operation. In the multiplication operation, at least one of operands includes a selectable number of bits, which may be selectable between a range between 1 and a larger integer. When a first operand 711 of the multiplication operation is $ABC_2$ that is a 3-bit binary value and a second operand 712 is $DEF_2$ that is a 3-bit binary value, a multiplication operation of the first operand 711 and the second operand 712 may be performed by calculating intermediate products through bitwise multiplication and thereafter adding the calculated intermediate products according to the same bit positions.

In detail, GHI 713 that is a first intermediate product is obtained by multiplying F that is an LSB of $DEF_2$ that is the second operand 712 and the first operand $ABC_2$ 711, JKL 714 that is a second intermediate product is obtained by multiplying E that is a second bit of the second operand $DEF_2$ 712 and the first operand $ABC_2$ 711, and MNO 715 that is a third intermediate product is obtained by multiplying D that is a third bit (e.g., an MSB) of the second operand $DEF_2$ 712 and the first operand $ABC_2$ 711. Thereafter, the first to third intermediate products 713 to 715 are added according to the same bit positions to obtain $PQRSTU_2$ that is a result 716 of the multiplication operation result performed between the first operand $ABC_2$ 711 and the second operand $DEF_2$ 712. A method of performing the operation (e.g., the multiplication operation) of FIG. 7A by the neural network processing circuitry 112 of FIG. 5 will be described below.

FIG. 7B is a diagram for describing mapping of operands to an activation and a weight to perform an operation (e.g., a multiplication operation), according to some example embodiments.

Referring to FIG. 7B, bit values A, B, and C of the first operand $ABC_2$ 711 of FIG. 7A are mapped to a weight 720. An MSB of the first operand $ABC_2$ 711 is mapped to an MSB of the weight 720 and an LSB thereof is mapped to an LSB of the weight 70.

In the same manner, bit values D, E, and F of the second operand $DEF_2$ 712 of FIG. 7A are mapped to an activation 710. An MSB of the second operand $DEF_2$ 712 is mapped to an MSB of the activation 710 and an LSB thereof is mapped to an LSB of the activation 710.

However, some example embodiments may not be limited thereto. For example, as shown in the example embodiment of FIG. 7A, the first operand $ABC_2$ 711 and the second operand $DEF_2$ 712 of FIG. 7A may be mapped to bit positions on the activation 710 and the weight 720 in a different mapping method, unlike the mapping method described above with reference to FIG. 7B. However, when the different mapping method is applied, the controller circuitry 1124 may determine combinations of i and j to correspond to the mapped bit positions in a manner different than that described above.

Figure 7C:
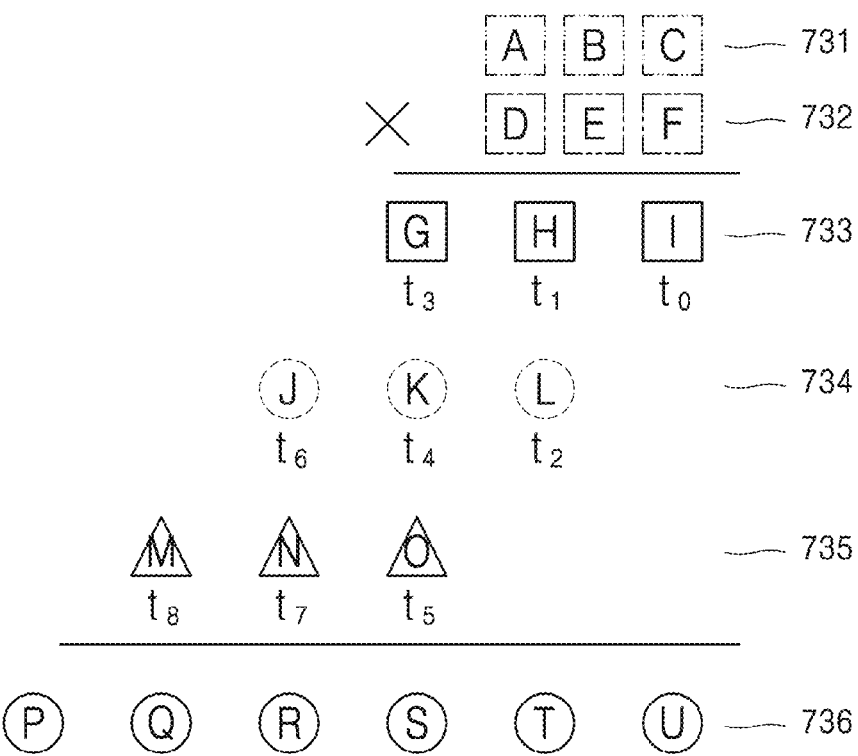
FIG. 7C is a diagram for describing processing, by a neural network processor, operands and intermediate products of an operation (e.g., a variable-resolution multiplication operation) in a time-division manner, according to some example embodiments.

FIG. 7C is a diagram for describing processing, by a neural network processor, operands and intermediate products of an operation (e.g., a variable-resolution multiplication operation) in a time-division manner, according to some example embodiments.

Referring to FIG. 7C, as described above with reference to FIG. 7B, bit values A, B, and C of $ABC_2$ that is a first operand 731 are mapped to the weight 720 and bit values D, E, and F of $DEF_2$ that is a second operand 732 are mapped to the activation 710.

Bit values of each of a first intermediate product GHI 733, a second intermediate product JKL 734, and a third intermediate product MNO 735, which are produced through multiplication of the bit values A, B, and C of the first operand $ABC_2$ 731 and the bit values D, E, and F of the second operand $DEF_2$ 732, may be obtained in the time-division manner. In detail, a bit value I of the first intermediate product GHI 733 may be obtained at a point of time $t_0$, a bit value H of the first intermediate product GHI 733 may be obtained at a point of time $t_1$, a bit value L of the second intermediate product JKL 734 may be obtained at a point of time $t_2$, and a bit value M of the third intermediate product MNO 635 may be obtained at a time point of $t_8$.

The points of time $t_0$ through $t_8$ may be different times, which may correspond to respective instances of performing the operation on bits of the operands. For example, a time delayed by a predetermined time from the point of time $t_0$ may be the point of time $t_1$, and a time delayed by a predetermined time from the point of time $t_1$ may be the point of time $t_2$. However, some example embodiments may not be limited thereto. Throughout the specification, a point of time t is not intended to indicate a specific moment, but for distinguishing timing or a time section when related operations are performed. Accordingly, it would be obvious to one of ordinary skill in the art that operations described herein to be performed at a specific point of time may not be necessarily simultaneously performed. For example, in some example embodiments, multiple bits of the operands may be processed concurrently, and the processing of a bit of the operands may affect (e.g., may result in a continuation and/or cessation of) concurrent processing of another bit of the operands. Some example embodiments may process bits of the operands in part concurrent and in part sequentially, such as where a processing of a first bit only partly overlaps a processing of a second bit, or where a bit is processed concurrently with another bit and sequentially with yet another bit.

An operation value 636 of the operation (e.g., a variable-resolution multiplication operation) performed on the first operand $ABC_2$ 731 and the second operand $DEF_2$ 732 is $PQRSTU_2$.

U, which is an LSB of the result $PQRSTU_2$ 636, is obtained using I of the first intermediate product GHI 633. T of the result $PQRSTU_2$ 636 is obtained from the sum of H of the first intermediate product GHI 733 and L of the second intermediate product JKL 734. S of the result $PQRSTU_2$ 736 is obtained from the sum of G of the first intermediate product GHI 733, K of the second intermediate product JKL 734, O of the third intermediate product MNO 735, and a carry value obtained from a previous bit position. In this way, the result $PQRSTU_2$ 736 may be sequentially obtained from U corresponding to the LSB to P corresponding to the MSB. In other words, the result $PQRSTU_2$ 736 may be obtained based on the sum of bit values of the first through third intermediate products 733 through 735 sequentially obtained at the point of time $t_0$ to the point of time $t_8$.

Figure 7D:
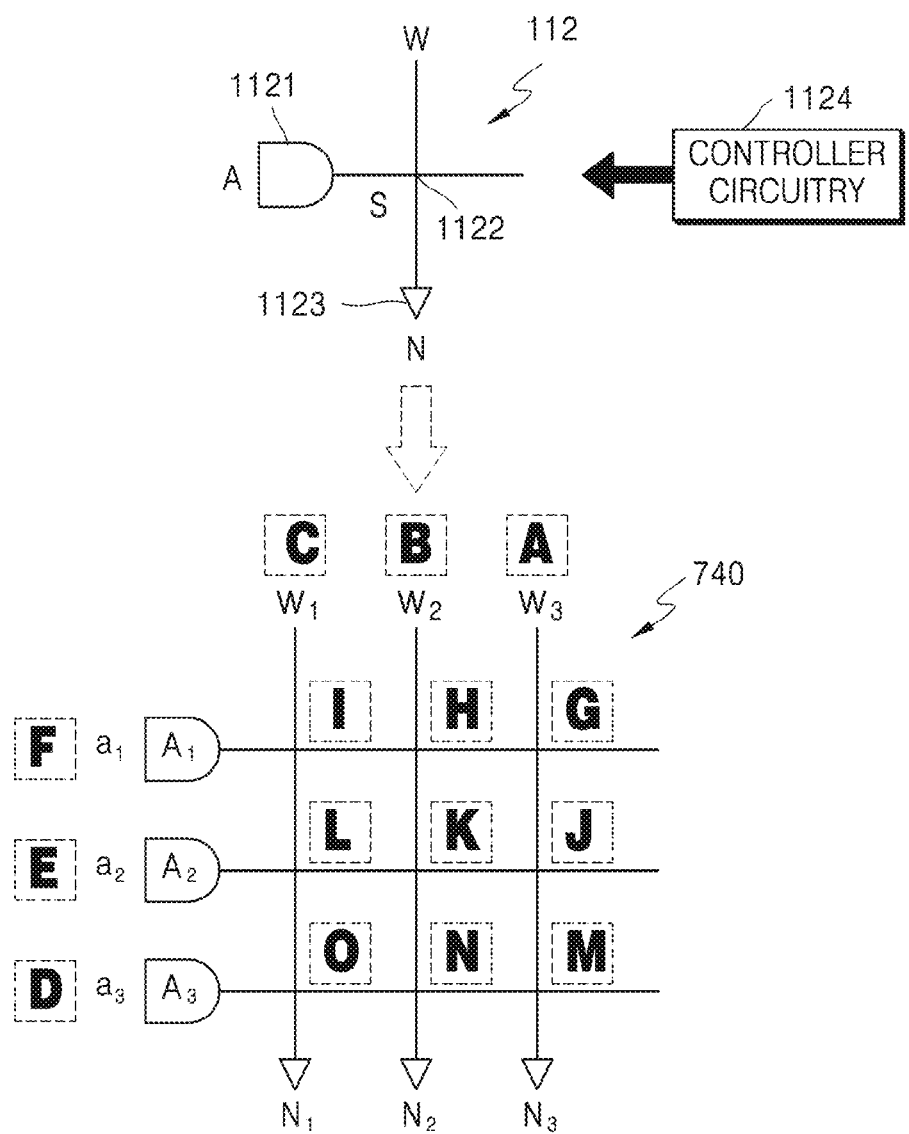
FIG. 7D is a diagram for describing virtual synapse array mapping for processing an operation by a neural network processor in a time-division manner, according to some example embodiments.

FIG. 7D is a diagram for describing virtual synapse array mapping for processing an operation by a neural network processor in a time-division manner, according to some example embodiments.

Referring to FIG. 7D, as described above, the neural network processing circuitry 112 includes the axon circuitry 1121, the synapse circuitry 1122, the neuron circuitry 1123, and the controller circuitry 1124, but when the neural network processing circuitry 112 operates in the time-division manner, the neural network processing circuitry 112 may operate as if a 2D synapse array including neuron circuitry, synapse circuitry, and/or neuron circuitry, is processed. As shown in the example embodiment of FIG. 7D, a 2D synapse array simulated to be processed by the neural network processing circuitry 112 in the time-division manner is referred to as a virtual synapse array 740, but is not limited thereto and may be alternately referred to as another term. In other words, in some example embodiments, physical circuitry configurations (for example, at least one synapse circuitry and at least one neuron circuit) of the virtual synapse array 740 may not be implemented by the neural network processing circuitry 112.

FIG. 7D illustrates the 3×3 virtual synapse array 740 to be described in relation to the operation (the 3-bit×3-bit multiplication operation) described above with reference to FIGS. 7A through 7C. However, according to the example embodiment shown in FIG. 7D, an array including various numbers of rows and columns may be used.

In the 3×3 virtual synapse array 740, the second operand $DEF_2$ 732 of FIG. 7C is mapped to activations $a_3$, $a_2$, and $a_1$, and the first operand $ABC_2$ 731 of FIG. 7C is mapped to weights $w_3$, $w_2$, and $w_1$. The bit value I of the first intermediate product GHI 733 of FIG. 7C may be obtained by performing an operation between the activation $a_1$ (bit value $a_1$=F) and the weight $w_1$ (bit value $w_1$=C), in a synapse in which the activation $a_1$ and the weight $w_1$ are provided to cross each other. Similarly, in the 3×3 virtual synapse array 740, bit values of all the first through third intermediate products 733 through 735 may be mapped as illustrated in FIG. 7D by performing operations in synapses in which the axons $a_3$, $a_2$, and $a_1$ and the weights $w_3$, $w_2$, and $w_1$ are provided to cross each other.

The controller circuitry 1124 determines activations and weights to be provided to the axon circuitry 1121 and the synapse circuitry 1122 such that mapping is performed in the above manner of the virtual synapse array 740.

Figure 8A:
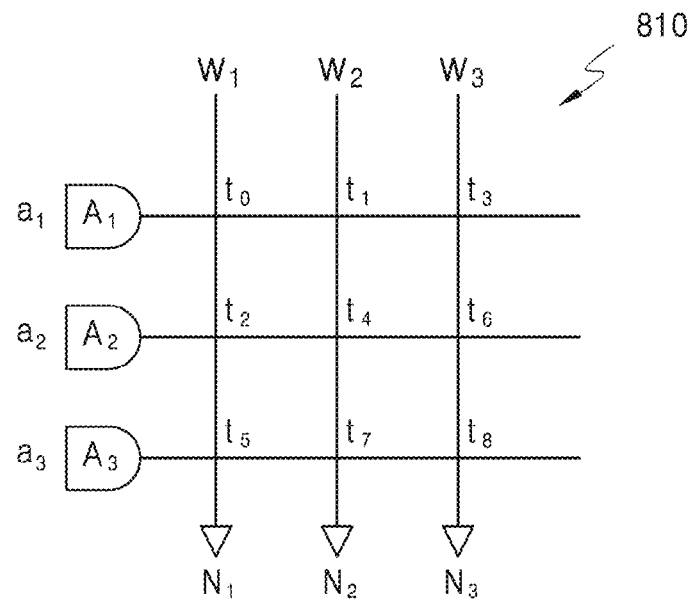
FIGS. 8A and 8B are diagrams for describing an order in which operations are to be performed by a neural network processor in a time-division manner to process an operation, according to some example embodiments.
Figure 8B:
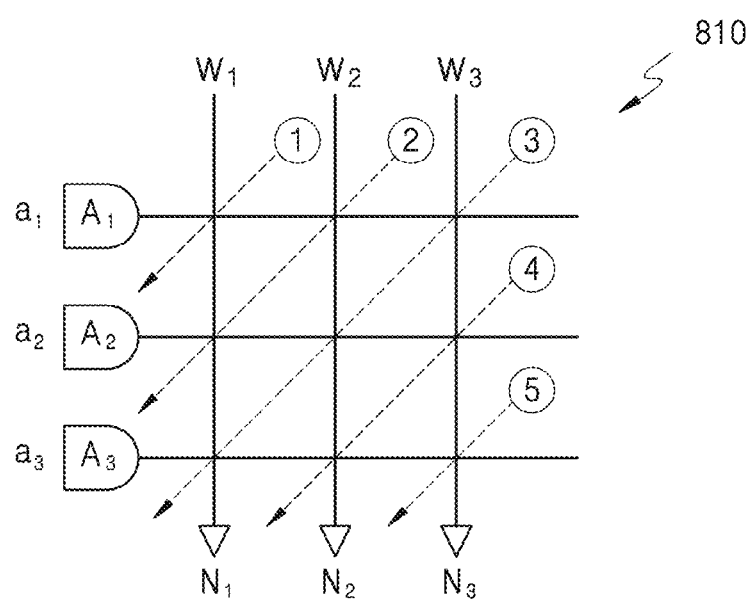

FIGS. 8A and 8B are diagrams for describing an order in which operations are to be performed by a neural network processor in a time-division manner to process an operation, according to some example embodiments.

Referring to FIG. 8A, operations are performed between activations $a_1$, $a_2$, and $a_2$ and weights $w_1$, $w_2$, and $w_2$ at synapses at intersections of the activations $a_1$, $a_2$, and $a_2$ and the weights $w_1$, $w_2$, and $w_2$ in a virtual synapse array 810. The neural network processing circuitry 112 may perform the operations at the intersections of the virtual synapse array 810 in the time-division manner.

According to the mapping method described above with reference to FIGS. 7A and 7D, at a at point of time $t_0$, the neural network processing circuitry 112 provides the axon $a_1$ to the axon circuitry 1121 and the synaptic weight $w_1$ to the synapse circuitry 1122 and obtains an operation value between the axon $a_1$ and the synaptic weight $w_1$. Next, at a point of time $t_1$, the neural network processing circuitry 112 provides the activation $a_1$ to the axon circuitry 1121 and the weight $w_2$ to the synapse circuitry 1122 and obtains a synaptic operation value between the axon $a_1$ and the synaptic weight $w_2$. In a similar manner, the neural network processing circuitry 112 sequentially performs operations up to a point of time $t_8$.

Referring to FIG. 8B, when the order described above with reference to FIG. 8A is indicated by arrows, it may be understood that operations are performed at the point of time $t_0$ to the point of time $t_8$ in an order of diagonal directions in the virtual synapse array 810. Accordingly, in the example of FIG. 8B, this order is based on a method by which the values of i and j are chosen and mapped by the controller circuitry 1124, such that combinations from a combination of the $i^{th}$ bit and the $j^{th}$ bit mapped such that the sum of the values i and j is smallest to a combination of the $i^{th}$ bit to the $j^{th}$ bit mapped such that the sum of the values i and j is largest are sequentially assigned to each of the axon circuitry 1121 and the synapse circuitry 1122 as described above.

According to some example embodiments, the neural network processing circuitry 112 assigns some bit values of operands to the activations and the weights of the virtual synapse array 810 and performs operations in the order of diagonal directions of the FIG. 8B in the time-division manner, and thus is capable of performing an operation unlike a neural network processor of the related art.

Figure 8C:
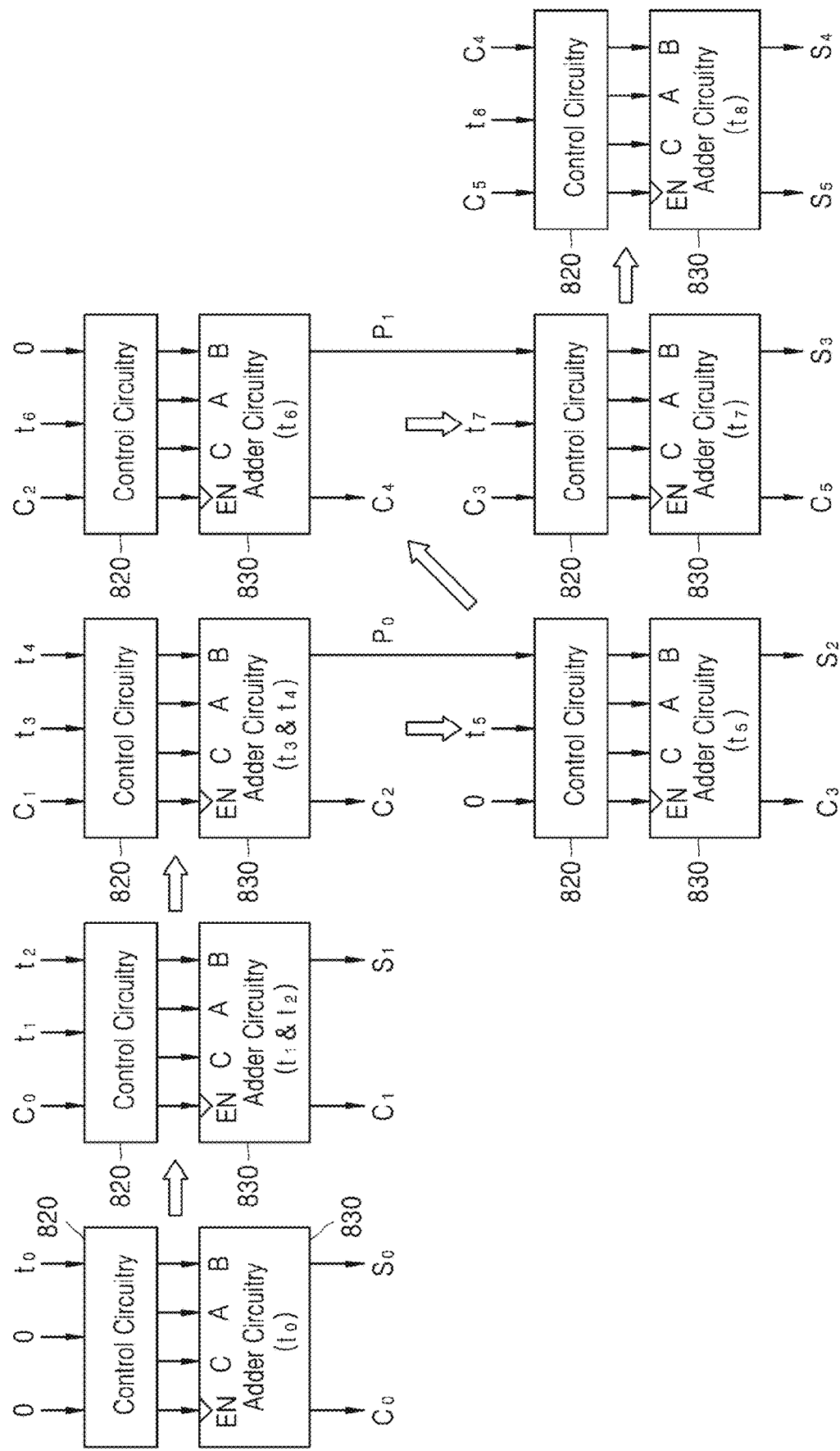
FIG. 8C is a diagram for describing in detail a process of performing an operation by a neural network processor in a time-division manner, according to some example embodiments.

FIG. 8C is a diagram for describing in detail a process of performing an operation by a neural network processor in the time-division manner, according to some example embodiments.

A process of performing an operation by control circuitry 820 and adder circuitry 830 of the neuron circuitry 1123 will be described using the examples, which are described above with reference to FIGS. 7A to 8B, below with reference to FIG. 8C.

At a point of time $t_0$, the controller circuitry 1124 assigns an activation $a_1$ to the neuron circuitry 1123 and a weight $w_1$ to the synapse circuitry 1122. When the weight $w_1$ is stored, the synapse circuitry 1122 performs an operation on the activation $a_1$ and the weight $w_1$ to obtain an operation value corresponding to point of time $t_0$.

At the point of time $t_0$, the control circuitry 820 receives predetermined initial values and an operation value corresponding to the point of time $t_0$, perform a determination whether the addition operation is to be performed by the adder circuitry 830, based on the received values, and outputs a positive determination or a negative determination (such as an enable signal or a disable signal), as a result of the determination.

At the point of time $t_0$, the adder circuitry 830 may receive the positive determination (such as the enable signal) from the control circuitry 820 and thus perform the addition operation. For example, the adder circuitry 830 receives a predetermined initial value "0" as an augend, receives the operation value corresponding to the point of time $t_0$ as an addend, and receives the predetermined initial value "0" as a previous carry value. When receiving all inputs, the adder circuitry 830 performs the addition operation and outputs an addition value $S_0$ and a carry value $C_0$. The addition value $S_0$ corresponds to an LSB among bits of an operation value of an operation (e.g., a variable-resolution multiplication operation). The carry value $C_0$ is input as a previous carry value of the addition operation to be performed next.

When receiving the negative determination (such as the disable signal) from the control circuitry 820, the adder circuitry 830 may skip the addition operation at the point of time $t_0$. In this case, the receiving of the negative determination (such as the disable signal) from the control circuitry 820 by the adder circuitry 830 means that the operation value corresponding to the point of time $t_0$ is "0" and thus both an addition value and a carry value that would be obtained from the adder circuitry 830 as if the addition operation were not skipped may be "0". Even when the addition operation is not performed by the adder circuitry 830, the neuron circuitry 1123 may determine the addition value $S_0$ and the carry value $C_0$ to "0", thereby reducing unnecessary power consumption. It is to be appreciated that some example embodiments may perform various types of arithmetic and/or logical processing, and may produce an arithmetic value such as a sum, difference, product, and/or dividend, in addition to a carry value.

At a point of time $t_1$, the controller circuitry 1124 assigns the activation $a_1$ to the neuron circuitry 1123 and assigns a weight $w_2$ to the synapse circuitry 1122. When the weight $w_2$ is stored, the synapse circuitry 1122 performs an operation on the activation $a_1$ and the weight $w_2$ to obtain an operation value corresponding to the point of time $t_1$.

At a point of time $t_2$, the controller circuitry 1124 assigns an activation $a_2$ to the neuron circuitry 1123 and the weight $w_1$ to the synapse circuitry 1122. When the weight $w_1$ is stored, the synapse circuitry 1122 performs an operation on the activation $a_2$ and the weight $w_1$ to obtain an operation value corresponding to the point of time $t_2$.

When receiving all inputs such as the carry value $C_0$, the operation value corresponding to the point of time $t_1$, and the operation value corresponding to the point of time $t_2$, the control circuitry 820 performs a determination whether the addition operation is to be performed by the adder circuitry 830, based on the received values, and outputs the positive determination or the negative determination (such as the enable signal or the disable signal) as a result of the determination.

When receiving the positive determination (such as the enable signal) from the control circuitry 820, the adder circuitry 830 may perform the addition operation. For example, the adder circuitry 830 performs the addition operation and outputs an addition value $S_1$ and a carry value $C_1$ when receiving all inputs, such as the carry value $C_0$, the operation value corresponding to the point of time $t_1$, and the operation value corresponding to the point of time $t_2$. The addition value $S_1$ corresponds to a bit value of a second bit among the bits indicating the operation value of the operation (e.g., a variable-resolution multiplication operation). The carry value $C_1$ is input as a previous carry value of the addition operation to be performed next. When receiving the negative determination (such as the disable signal) from the control circuitry 820, the adder circuitry 830 may skip the addition operation at the point of time $t_2$. It would be obvious to those of ordinary skill in the art that when the addition operation to be performed by the adder circuitry 830 is skipped, an addition value or a carry value necessary to perform the addition operation at a subsequent point of time or to determine one of the bits indicating the operation value of the operation may be appropriately determined, based on the above description related to the operation at the point of time $t_0$.

At a point of time $t_3$, the controller circuitry 1124 assigns the activation $a_1$ to the neuron circuitry 1123 and a weight $w_3$ to the synapse circuitry 1122. The synapse circuitry 1122 obtains an operation value corresponding to the point of time $t_3$. At a point of time $t_4$, the controller circuitry 1124 assigns the activation $a_2$ to the neuron circuitry 1123 and the weight $w_2$ to the synapse circuitry 1122. The synapse circuitry 1122 obtains an operation value corresponding to the point of time $t_4$.

When receiving all inputs such as the carry value $C_1$, the operation value corresponding to the point of time $t_3$, and the operation value corresponding to the point of time $t_4$, the control circuitry 820 performs a determination whether the addition operation is to be performed by the adder circuitry 830, based on the received values, and outputs the positive determination or the negative determination (such as the enable signal or the disable signal) as a result of the determination.

When receiving the positive determination (such as the enable signal) from the control circuitry 820, the adder circuitry 830 may perform the addition operation. For example, when receiving all inputs such as the carry value $C_1$, the operation value corresponding to the point of time $t_3$, and the operation value corresponding to the point of time $t_4$, the adder circuitry 830 performs the addition operation and outputs an addition value $P_0$ and a carry value $C_2$. The addition value $P_0$ is used as an input for the adder circuitry 830 to perform the addition operation to be performed next at a point of time $t_5$. The carry value $C_2$ is input as a previous carry value for the addition operation to be performed next. When receiving the negative determination (such as the disable signal) from the control circuitry 820, the adder circuitry 830 may skip the addition operation at the point of time $t_4$.

At the point of time $t_5$, the controller circuitry 1124 assigns an activation $a_3$ to the neuron circuitry 1123 and the weight $w_1$ to the synapse circuitry 1122. The synapse circuitry 1122 obtains an operation value corresponding to the point of time $t_5$.

When receiving all inputs such as the operation value corresponding to the point of time $t_5$, the previously obtained addition value $P_0$, and the predetermined carry value "0", the control circuitry 820 performs a determination whether an addition value is to be performed by the adder circuitry 830, based on the received values, and outputs the positive determination or the negative determination (such as the enable signal or the disable signal) as a result of the determination.

When receiving the positive determination (such as the enable signal) from the control circuitry 820, the adder circuitry 830 may perform the addition operation. For example, when receiving all inputs such as the operation value corresponding to the point of time $t_5$, the previously obtained addition value $P_0$, and the predetermined carry value "0", the adder circuitry 830 performs the addition operation and outputs an addition value $S_2$ and a carry value $C_3$. The addition value $S_2$ corresponds to a bit value of a third bit among the bits indicating the operation value of the operation (e.g., a variable-resolution multiplication operation). The carry value $C_3$ is input as a previous carry value of the addition operation to be performed next. When receiving the negative determination (such as the disable signal) from the control circuitry 820, the adder circuitry 830 may skip the addition operation at the point of time $t_5$.

At point of time $t_6$, the controller circuitry 1124 assigns the activation $a_2$ to the neuron circuitry 1123 and the weight $w_3$ to the synapse circuitry 1122. The synapse circuitry 1122 obtains an operation value corresponding to the point of time $t_6$.

When receiving all inputs such as the operation value corresponding to the point of time $t_6$, the predetermined initial value "0" and the carry value $C_2$, the control circuitry 820 performs a determination whether the addition operation is to be performed by the adder circuitry 830, based on the received values, and outputs the positive determination or the negative determination (such as the enable signal or the disable signal) as a result of the determination.

When receiving the positive determination (such as the enable signal) from the control circuitry 820, the adder circuitry 830 may perform the addition operation. For example, when receiving all inputs such as the operation value corresponding to the point of time $t_6$, the predetermined initial value "0" and the carry value $C_2$, the adder circuitry 830 performs the addition operation and outputs an addition value $P_1$ and a carry value $C_4$. The addition value $P_1$ is used as an input for the adder circuitry 830 to perform the addition operation next at a point of time $t_7$. The carry value $C_4$ is input as a previous carry value for the addition operation to be performed next. When receiving the negative determination (such as the disable signal) from the control circuitry 820, the adder circuitry 830 may skip the addition operation at the point of time $t_6$.

At the point of time $t_7$, the controller circuitry 1124 assigns the activation $a_3$ to the neuron circuitry 1123 and the weight $w_2$ to the synapse circuitry 1122. The synapse circuitry 1122 obtains an operation value corresponding to the point of time $t_7$.

When receiving all inputs such as the operation value corresponding to the point of time $t_7$, the previously obtained addition value $P_1$, and the carry value $C_3$, the control circuitry 820 determines whether the addition operation is to be performed by the adder circuitry 830, based on the received values, and outputs the positive determination or the negative determination (such as the enable signal or the disable signal) as a result of the determination.

When receiving the positive determination (such as the enable signal) from the control circuitry 820, the adder circuitry 830 may perform the addition operation. For example, when receiving all inputs such as the operation value corresponding to the point of time $t_7$, the previously obtained addition value $P_1$ and the carry value $C_3$, the adder circuitry 830 performs the addition operation and outputs an addition value $S_3$ and the carry value $C_5$. The addition value $S_3$ corresponds to a bit value of a fourth bit among the bits of the operation value of the operation (e.g., the variable-resolution multiplication operation). The carry value $C_5$ is input as a previous carry value for the addition operation to be performed next. When receiving the negative determination (such as the disable signal) from the control circuitry 820, the adder circuitry 830 may skip the addition operation at the point of time $t_7$.

At a point of time $t_8$, the controller circuitry 1124 assigns the activation $a_3$ to the neuron circuitry 1123 and the weight $w_3$ to the synapse circuitry 1122. The synapse circuitry 1122 obtains an operation value corresponding to the point of time $t_8$.

When receiving all inputs such as the operation value corresponding to the point of time $t_8$, the carry value $C_4$ and the carry value $C_5$, the control circuitry 820 performs a determination whether the addition operation is to be performed by the adder circuitry 830, based on the received values, and outputs the positive determination or the negative determination (such as the enable signal or the disable signal) as a result of the determination.

When receiving the positive determination (such as the enable signal) from the control circuitry 820, the adder circuitry 830 may perform the addition operation. For example, when receiving all inputs such as the operation corresponding to the point of time $t_8$, the carry value $C_4$ and the carry value $C_5$, the adder circuitry 830 performs the addition operation and outputs an addition value $S_4$ and a carry value $S_5$. The addition values $S_4$ and $S_5$ respectively correspond to a bit value of a fifth bit and a sixth bit among the bits of the operation value of the operation (e.g., a variable-resolution multiplication operation). As such, $S_5 S_4 S_3 S_2 S_1 S_0$ may be produced as the operation value of the multiplication operation by sequentially performing operations at the point of time $t_0$ to the point of time $t_8$.

As described above, at each point of time, the control circuitry 820 of the neuron circuitry 1123 may be configured to perform a determination whether the addition operation is to be performed by the adder circuitry 830, and output the positive determination or the negative determination (such as the enable signal or the disable signal) as a result of the determination. An unnecessary operation to be performed by the control circuitry 820 may be skipped by the adder circuitry 830, and thus, power consumption for driving the neural network processing circuitry 112 may be reduced.

The adder circuitry 830 may be reused to perform the addition operation at each point of time. For example, the adder circuitry 830 may receive the positive determination (such as the enable signal) from the control circuitry 820, perform the addition operation when all inputs are received, and store previous operation values (e.g., arithmetic and/or logical values such as addition values, carry values, etc.) in a memory (a buffer, a register, or the like) connected to the adder circuitry 830 to perform a next addition operation. The previous addition operation values stored in the memory may be reset and reused before a next addition operation is performed. That is, in some example embodiments, the neural network processing circuitry 112 may be configured to perform the multiplication operation by reusing the adder circuitry 830 and thus circuitry area for realizing the neural network processing circuitry 112 may be reduced.

Figure 9:
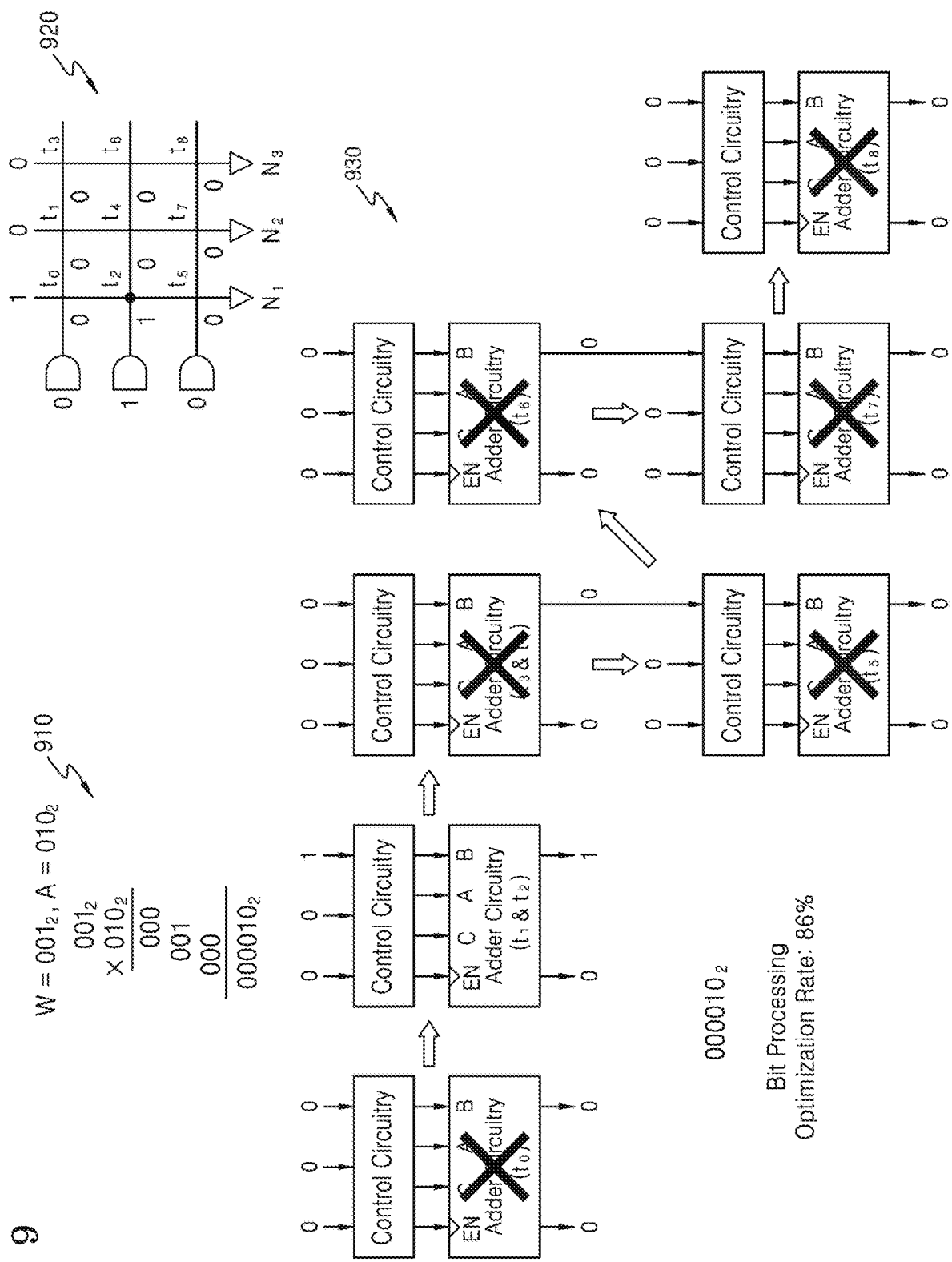
FIG. 9 is a diagram illustrating an example of a process of processing a 3-bit×3-bit multiplication operation by a neural network processor, according to some example embodiments.

FIG. 9 is a diagram illustrating an example of a process of processing a 3-bit×3-bit multiplication operation by a neural network processor, according to some example embodiments.

FIG. 9 illustrates a virtual synapse array 920 for performing a variable-resolution multiplication operation 910 on a 3-bit weight $001_2$ and a 3-bit activation $010_2$, and a sequential operation process 930 of performing the multiplication operation 910. When the multiplication operation 910 is performed on the 3-bit weight $001_2$ and the 3-bit activation $010_2$ in the above-described manner, $000010_2$ which is a 6-bit multiplication result may be produced as an operation value of the multiplication operation.

During the process, six addition operations among a total of seven addition operations to be performed by the adder circuitry 830 may be skipped by the control circuitry 820 and thus power consumption needed to drive the adder circuitry 830 may be reduced by about 86%. It will be obvious to those of ordinary skill in the art that an effect of reducing power consumption by skipping unnecessary operations may vary according to a weight and an activation but it may be more efficient on average when unnecessary operations are skipped than when the unnecessary operations are not skipped.

For convenience of explanation, a 3-bit×3-bit multiplication operation has been described as an example of a variable-resolution operation. However, it would be obvious to those of ordinary skill in the art that the neural network processing circuitry 112 may also perform the multiplication operation on other various bits through a distribution and time-division processing of bit values of an activation and a weight.

Figure 10:
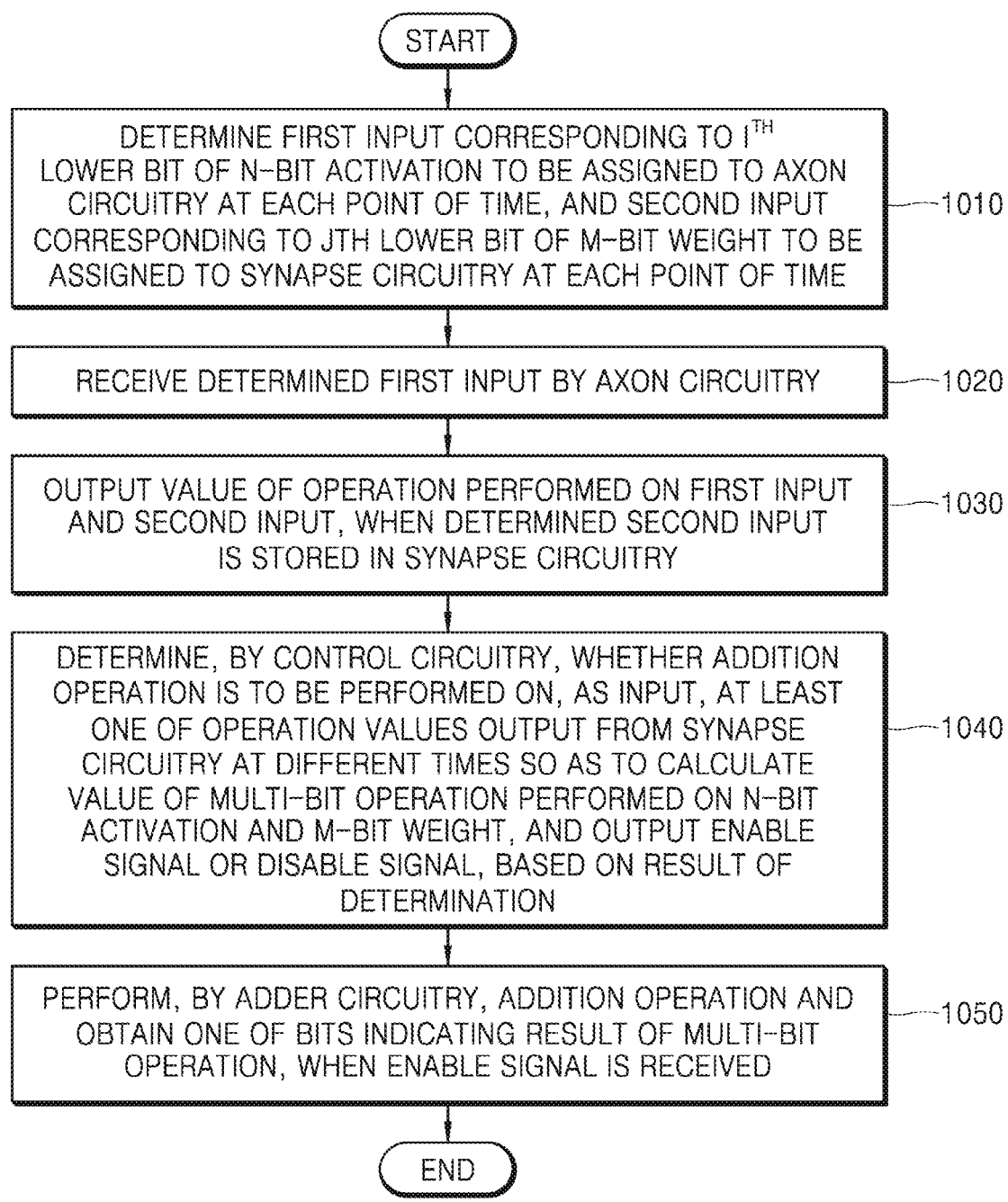
FIG. 10 is a flowchart of a method of processing an operation by a neural network apparatus, according to some example embodiments.

FIG. 10 is a flowchart of a method of processing an operation by a neural network apparatus, according to some example embodiments.

Referring to FIG. 10, the method of processing the operation by the neural network apparatus includes operations processed by the neural network apparatus as described above in a time-series manner. Accordingly, the above description with reference to the drawings, even when not given below, is also applicable to the method of FIG. 10.

In operation 1010, the controller circuitry 1124 of the neural network apparatus 100 determines a first input corresponding to an $i^{th}$ bit of an n-bit activation to be assigned to the axon circuitry 1121 at each point of time, and a second input corresponding to a $j^{th}$ bit of an m-bit weight to be assigned to the synapse circuitry 1122 at each point of time. In this case, the controller circuitry 1124 may repeatedly determine a first input and a second input to be assigned at each point of time until an operation value of the operation is produced sequentially from a bit value to an upper bit value.

In operation 1020, the axon circuitry 1121 receives the determined first input.

In operation 1030, the synapse circuitry 1122 outputs a value of an operation performed between the first input and the second input when the determined second input is stored.

In operation 1040, the control circuitry 820 of the neuron circuitry 1123 may perform a determination whether an addition operation is to be performed on, as an input, at least one of operation values output from the synapse circuitry 1122 to produce an operation value of the operation performed between the n-bit activation and the m-bit weight, and may output the positive determination or the negative determination (such as the enable signal or the disable signal) as a result of the determination.

In operation 1050, when receiving the positive determination (such as the enable signal), the adder circuitry 830 of the neuron circuitry 1123 may perform the addition operation and obtain one of bits of an operation value of the operation. When receiving the negative determination (such as the disable signal) from the control circuitry 820, the adder circuitry 830 may skip the addition operation.

Figure 11:
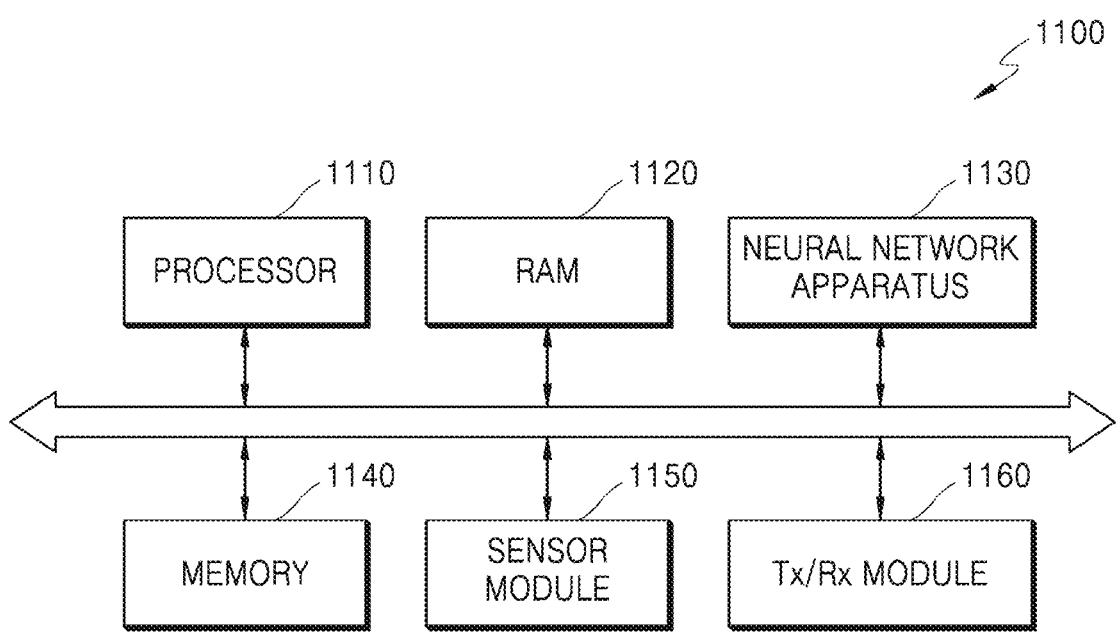
FIG. 11 is a block diagram of a configuration of an electronic system according to some example embodiments.

FIG. 11 is a block diagram of a configuration of an electronic system 1100 according to some example embodiments.

Referring to FIG. 11, the electronic system 1100 may extract valid information by analyzing input data in real-time based on a neural network and determine a situation based on the extracted valid information or control components of an electronic device on which the electronic system 1100 is mounted. For example, the electronic system 1100 is applicable to a robot apparatus, such as a drone or an advanced drivers assistance system (ADAS), a smart TV, a smart phone, a medical device, a mobile device, an image display device, a measuring device, an IoT device, etc., and may be mounted on at least one of various types of electronic devices.

The electronic system 1100 may include a processor 1110, RAM 1120, a neural network apparatus 1130, a memory 1140, a sensor module 1150, and a communication (Tx/Rx) module 1160. The electronic system 1100 may further include an input/output module, a security module, a power control device, etc. At least some of hardware components of the electronic system 1100 may be mounted on at least one semiconductor chip.

The processor 1110 controls overall operations of the electronic system 1100. The processor 1110 may include one processor core (core) or a plurality of processor cores (multi-core). The processor 1110 may process or execute programs and/or data stored in the memory 1140. In some example embodiments, the processor 1110 may execute the programs stored in the memory 1140 to control functions of the neural network apparatus 1130. The processor 1110 may be a central processing unit (CPU), a graphics processing unit (GPU), an application processor (AP), or the like.

The RAM 1120 may temporarily store programs, data, or instructions. For example, the programs and/or data stored in the memory 1140 may be temporarily stored in the RAM 1120 under control of the processor 1110 or according to booting code. The RAM 1120 may be embodied as a memory such as DRAM or SRAM.

The neural network apparatus 1130 may be configured to perform an operation of a neural network based on received input data and generate an information signal based on the operation value of the operation, where the information signal may encode and/or be based on the operation value of the operation. The neural network may include a CNN, an RNN, an FNN, deep belief networks, restricted Boltzmann machines, etc. but is not limited thereto. In some example embodiments, the neural network apparatus 1130 may be a neural network-exclusive hardware accelerator or a device including the same, and may correspond to the neural network apparatus 100 of FIG. 5 described above.

The information signal may include one of various types of recognition signals, such as a voice recognition signal, an object recognition signal, an image recognition signal, a biometric information recognition signal, etc. In some example embodiments, the neural network apparatus 1130 may be configured to receive, as input data, frame data included in a video stream, and generate a recognition signal with respect to an object included in an image indicated by the frame data from the frame data. However, some example embodiments may not be limited thereto; for example, the neural network apparatus 1130 may be configured to receive various types of input data according to a type or function of an electronic apparatus on which the electronic system 1100 is mounted, and to generate a recognition signal based on the input data.

The memory 1140 is a storage space for storing data, and may store an operating system (OS), various programs, and various types of data. In some example embodiments, the memory 1140 may be configured to store intermediate results generated during performing an operation in the neural network apparatus 1130.

The memory 1140 may be DRAM but is not limited thereto. The memory 1140 may include at least one of a volatile memory or a nonvolatile memory. Examples of the nonvolatile memory include ROM, PROM, EPROM, EEPROM, a flash memory, PRAM, MRAM, RRAM, FRAM, etc. Examples of the volatile memory include DRAM, SRAM, SDRAM, PRAM, MRAM, RRAM, FeRAM, etc. In some example embodiments, the memory 1140 may include at least one of an HDD, an SSD, a CF, an SD, a Micro-SD, a Mini-SD, an xD, or a memory stick The sensor module 1150 may collect surrounding information of an electronic apparatus on which the electronic system 1100 is mounted. The sensor module 1150 may sense or receive a signal (for example, an image signal, a voice signal, a magnetic signal, a biometric signal, or a touch signal) from the outside of the electronic apparatus, and convert the sensed or received signal into data. To this end, the sensor module 1150 may include at least one of various types of sensing devices, such as a microphone, an image pickup device, an image sensor, a light detection and ranging (LIDAR) sensor, an ultrasound sensor, an infrared sensor, a bio-sensor, and a touch sensor.

The sensor module 1150 may provide, as input data, the data converted from the sensed or received signal to the neural network apparatus 1130. For example, the sensor module 1150 may include an image sensor, and may generate a video stream by photographing an external environment of the electronic apparatus and sequentially provide consecutive data frames of the video stream as input data to the neural network apparatus 1130. However, some example embodiments may not be limited thereto; for example, the sensor module 1150 may provide various types of data to the neural network apparatus 1130.

The communication (Tx/Rx) module 1160 may include various wired or wireless interfaces to communicate with an external device. For example, the communication (Tx/Rx) module 1160 may include communication interfaces to connect to a local area network (LAN), a wireless LAN (WLAN) such as wireless fidelity (Wi-Fi), a wireless personal area network (WPAN) such as Bluetooth, wireless universal serial bus (USB), ZigBee, near-field communication (NFC), radio-frequency identification (RFID), power line communication (PLC), a mobile cellular network such as $3^{rd}$ generation (3G), $4^{th}$ generation (4G), or long-term evolution (LTE), etc.

The above-described example embodiments of the present disclosure may be embodied as computer programs and implemented in general-use digital computers capable of executing the programs via a computer-readable recording medium. Data structures such as those employed in the example embodiments may be recorded on a computer-readable recording medium through various means. Examples of the computer-readable recording medium include magnetic storage media (e.g., ROM, floppy disks, hard disks, etc.), optical recording media (e.g., CD-ROMs, DVDs, etc.), and so on.

While the present disclosure has been described above with respect to some example embodiments thereof, it will be understood by those of ordinary skill in the art that various changes in form and details may be made therein without departing from the spirit and scope of the present disclosure. Accordingly, the example embodiments set forth herein should be considered in a descriptive sense only and not for purposes of limitation. The scope of the present disclosure is defined not by the foregoing description but by the appended claims, and all modifications within the scope of equivalents should be construed as being included in the scope of the present disclosure.

What is claimed is:

1. A neural network apparatus that processes an operation, the neural network apparatus comprising:
   neural network circuitry configured to,
   map i and j such that an ith bit of an n-bit activation and a jth bit of an m-bit weight are differently combined for respective instances of performing the operation, wherein n is a natural number and i is a natural number between 1 and n inclusive, and wherein m is a natural number and j is a natural number between 1 and m inclusive;
   receive, for each of the respective instances, a first input corresponding to the $i^{th}$ bit of the n-bit activation;
   store, for each of the respective instances, a second input corresponding the $i^{th}$ bit of the m-bit weight;
   perform, for each of the respective instances, a determination whether the operation is to be performed on the $i^{th}$ bit and the $j^{th}$ bit; and
   based on the determination being a positive determination,
   perform the operation on the $i^{th}$ bit and the $j^{th}$ bit, and
   produce each bit of an operation value of the operation performed on the $i^{th}$ bit and the $j^{th}$ bit based on the determination.

2. The neural network apparatus of claim 1,
   wherein the neural network circuitry is configured to perform the determination based on whether another operation may be influenced by whether the operation is performed on, as an input, the operation value of the operation, and
   wherein the determination is a negative determination based on the another operation not being influenced by the operation value of the operation.

3. The neural network apparatus of claim 2, wherein,
   the operation includes an arithmetic operation,
   the neural network circuitry is configured to not perform the arithmetic operation when the determination is the negative determination, and
   the neural network circuitry is configured to produce the operation value of the operation including an arithmetic value and a carry value by performing the operation on the $i^{th}$ bit and the $j^{th}$ bit based on the determination.

4. The neural network apparatus of claim 1, wherein the neural network circuitry is configured to,
   receive a set of received values including at least one of,
   a predetermined initial value,
   a first operation value produced at a previous point of time, a second operation value produced at a current point of time,
an arithmetic value produced by the neural network circuitry at the previous point of time, and
a carry value produced by the neural network circuitry at the previous point of time, and
perform the determination as,
a negative determination based on the received values are the same as the first operation value, and
the positive determination based on any one of the received values being the same as the second operation value.

5. The neural network apparatus of claim 1, wherein the neural network circuitry further comprises a full adder configured to perform the operation on, as inputs, a predetermined initial value, a first operation value produced by the neural network circuitry at a previous point of time, a second operation value produced by the neural network circuitry at a current point of time, an arithmetic value produced by the neural network circuitry at the previous point of time, and a carry value produced by the neural network circuitry at the previous point of time.

6. The neural network apparatus of claim 1, wherein at least one of an arithmetic value or a carry value produced by the neural network circuitry corresponds to a bit value of a set of bits produced by the operation.

7. The neural network apparatus of claim 1, wherein, after a bit of the operation value of the operation is produced, the neural network circuitry is configured to perform the operation again to produce another bit of the operation value of the operation.

8. The neural network apparatus of claim 1, wherein the neural network circuitry is further configured to determine the first input corresponding to the $i^{th}$ bit and the second input corresponding to the $j^{th}$ bit to sequentially obtain a lower bit value to an upper bit value of the operation value of the operation.

9. The neural network apparatus of claim 1, wherein the neural network circuitry is further configured to choose i and j such that combinations, ranging from a combination of the $i^{th}$ bit and the $j^{th}$ bit such that a sum of i and j is smallest to a combination of the $i^{th}$ bit and the $j^{th}$ bit such that a sum of i and j is largest, are sequentially performed by the neural network circuitry.

10. A method of processing an operation by a neural network apparatus, the method comprising:
determining a first input corresponding to an $i^{th}$ bit of an n-bit activation, and a second input corresponding to a $j^{th}$ bit of an m-bit weight;
performing a determination whether the operation is to be performed on the first input and the second input, and produce a positive determination or a negative determination as a result of the determination; and
performing the operation on the first input and the second input to produce an operation value of the operation based on the positive determination,
wherein n and m are natural numbers, i is a natural number between 1 and n inclusive, and j is a natural number between 1 and m inclusive, and
wherein producing the first input and the second input includes mapping i and j such that the $i^{th}$ bit and the $j^{th}$ bit are differently combined for respective instances of the operation.

11. The method of claim 10, wherein the positive determination is based on when the operation value of the operation may be influenced by the operation being performed on, as an input, at least one of the operation values produced by a preceding instance of the operation, and the negative determination is based on when the operation output of the operation may not be influenced by the operation value produced by the preceding instance of the operation.

12. The method of claim 11, further comprising:
skipping the operation based on the negative determination, and
determining an addition value and a carry value that are to be obtained based on the positive determination.

13. The method of claim 10, wherein the determination of the positive determination or the negative determination is based on,
receiving at least one of a predetermined initial value, an operation value produced at a previous point of time, an operation value produced at a current point of time, an addition value produced by at the previous point of time, and/or a carry value produced at the previous point of time;
performing the positive determination based on the received values being the same as a first value; and
performing the negative determination when any one of the received values is the same as a second value.

14. The method of claim 10, wherein the producing of one of the bits of the operation value of the operation includes performing the operation on, as inputs, a predetermined initial value, an operation value produced at a previous point of time, an operation value produced at a current point of time, an addition value produced at the previous point of time, and a carry value produced at the previous point of time.

15. The method of claim 10, wherein at least one of an addition value or a carry value corresponds to a bit value of one of bits of the operation value of the operation.

16. The method of claim 10, wherein the producing of one of the bits of the operation value of the operation includes, when a bit value of one of the bits of the operation value of the operation is produced, performing the operation again to produce another bit of the operation value of the operation.

17. The method of claim 10, wherein the mapping of i and j comprises choosing i and j such that combinations, ranging from a combination of the $i^{th}$ bit and the $j^{th}$ bit such that a sum of i and j is smallest to a combination of the $i^{th}$ bit and the $j^{th}$ bit such that a sum of i and j is largest, are sequentially performed.

18. A non-transitory computer-readable recording medium having recorded thereon a program that, when executed by a computer, performs the method of claim 10.

* * * * *